(12) United States Patent
Chung et al.

(10) Patent No.: US 9,745,644 B2
(45) Date of Patent: Aug. 29, 2017

(54) COMPOSITE NANOFIBER MEMBRANE FOR ADSORBING LITHIUM, METHOD OF MANUFACTURING THE SAME AND APPARATUS AND METHOD FOR RECOVERING LITHIUM USING THE SAME

(71) Applicant: MYONGJI UNIVERSITY INDUSTRY AND ACADEMIA COOPERATION FOUNDATION, Gyeonggi-do (KR)

(72) Inventors: Wook-Jin Chung, Gyeonggi-do (KR); Myoung Jun Park, Gyeonggi-do (KR); Grace M. Nisola, Gyeonggi-do (KR); Arnel B. Beltran, Gyeonggi-do (KR); Rey Eliseo C. Torrejos, Gyeonggi-do (KR); Jeong Gil Seo, Gyeonggi-do (KR); Seong-Poong Lee, Gyeonggi-do (KR); Young Deuk Yoo, Gyeonggi-do (KR)

(73) Assignee: MYONGJI UNIVERSITY INDUSTRY AND ACADEMIA COOPERATION FOUNDATION, Gyeonggi-do (KR)

( * ) Notice: Subject to any disclaimer, the term of this patent is extended or adjusted under 35 U.S.C. 154(b) by 244 days.

(21) Appl. No.: 14/597,654

(22) Filed: Jan. 15, 2015

(65) Prior Publication Data
US 2015/0258501 A1    Sep. 17, 2015

(30) Foreign Application Priority Data

Mar. 11, 2014   (KR) .................. 10-2014-0028378
Jan. 13, 2015   (KR) .................. 10-2015-0006066

(51) Int. Cl.
*D01F 1/02*     (2006.01)
*D01F 1/10*     (2006.01)
(Continued)

(52) U.S. Cl.
CPC ............. *C22B 26/12* (2013.01); *B01J 20/041* (2013.01); *B01J 20/06* (2013.01);
(Continued)

(58) Field of Classification Search
CPC .... D01D 5/003; D01D 5/0038; D01D 5/0046; D01D 5/0084; D01F 1/02; D01F 1/10; D06M 11/11
(Continued)

(56) References Cited

U.S. PATENT DOCUMENTS

2004/0126305 A1*  7/2004  Chen .................. D01F 9/12
                                                 423/447.5
2010/0330419 A1* 12/2010  Cui ..................... D01D 5/0084
                                                 429/209

FOREIGN PATENT DOCUMENTS

KR   10-2005-0045786 A    5/2005
KR   10-2005-0045792 A    5/2005
(Continued)

OTHER PUBLICATIONS

Machine translation of KR 10-2014-0118748-A, published on Oct. 8, 2014.*
(Continued)

*Primary Examiner* — Leo B Tentoni
(74) *Attorney, Agent, or Firm* — Vorys, Sater, Seymour & Pease LLP; Mih Suhn Koh

(57) ABSTRACT

Disclosed are a composite nanofiber membrane for the adsorption of lithium, a method for preparing the same, and a lithium recovery apparatus and method using the same. The composite nanofiber membrane for the adsorption of lithium is immobilized with manganese oxide selectively adsorptive of lithium. The composite nanofiber membrane for lithium adsorption exhibits high selectivity for lithium ions and allows for the rapid and easy diffusion of lithium
(Continued)

ions through interstitial spaces of the adsorbent. Particularly, the lithium recovery apparatus using the composite nanofiber membrane for lithium adsorption is able to effectively adsorb lithium ions dissolved in seawater in a selective manner within a short period of time, thus reducing the time taken for the adsorption process.

6 Claims, 27 Drawing Sheets
(26 of 27 Drawing Sheet(s) Filed in Color)

(51) Int. Cl.
| | |
|---|---|
| *D06M 11/11* | (2006.01) |
| *C22B 26/12* | (2006.01) |
| *D01D 5/00* | (2006.01) |
| *B01J 20/04* | (2006.01) |
| *B01J 20/06* | (2006.01) |
| *B01J 20/28* | (2006.01) |
| *C02F 103/08* | (2006.01) |
| *C02F 101/20* | (2006.01) |

(52) U.S. Cl.
CPC ... *B01J 20/28033* (2013.01); *B01J 20/28038* (2013.01); *D01D 5/003* (2013.01); *D01D 5/0038* (2013.01); *D01D 5/0046* (2013.01); *D01D 5/0084* (2013.01); *C02F 2101/20* (2013.01); *C02F 2103/08* (2013.01)

(58) Field of Classification Search
USPC ..... 264/10, 171.1, 211.13, 211.14, 232, 464, 264/465, 466, 484
See application file for complete search history.

(56) References Cited

FOREIGN PATENT DOCUMENTS

| KR | 10-2005-0045793 A | 5/2005 |
|---|---|---|
| KR | 10-0791512 B1 | 1/2008 |
| KR | 10-2009-0130566 A | 12/2009 |
| KR | 10-2010-0057520 A | 5/2010 |
| KR | 1020140118748 A * | 10/2014 |

OTHER PUBLICATIONS

Park et al., "Recyclable composite nanofiber adsorbent for Li+ recovery from seawater desalination retentate", Chemical Engineering Journal, vol. 254, pp. 73-81, (2014).

* cited by examiner

COMPOSITE NANOFIBER MEMBRANE FOR ADSORBING LITHIUM, METHOD OF MANUFACTURING THE SAME AND APPARATUS AND METHOD FOR RECOVERING LITHIUM USING THE SAME

BACKGROUND OF THE INVENTION

1. Field of the Invention

The present invention relates to a composite nanofiber membrane for the adsorption of lithium, a method for preparing the same, and a lithium recovery apparatus and method using the same. More particularly, the present invention relates to a composite nanofiber membrane for the adsorption of lithium, which is immobilized with manganese oxide selectively adsorptive of lithium, a preparation method thereof, and a lithium recovery apparatus and method using the same.

2. Description of the Related Art

The interest in lithium recovery from natural reservoirs has been driven by its growing demand as a useful core component of high-energy storage batteries for electric vehicles and portable electronic appliances such as smart phones, tablet PCs, etc., which have recently been developed and have risen sharply in demand. Accordingly, with the current worldwide rate of energy consumption, research is now focused on finding other potential sources of lithium such as the seawater, which is estimated to contain approximately $2.5 \times 10^{14}$ kg of lithium. However, lithium in seawater (as $Li^+$) is very diluted with an average concentration of 0.17 mg/L in comparison to other cations. Thus, its recovery from seawater requires a highly selective technique for lithium.

So far, one of the most promising methods to sequester lithium ions from seawater is lithium adsorption. In recent years, a variety of inorganic lithium ion-sieves (LIS) such as the spinel-type hydrous manganese oxides derived from lithium manganese oxides have been developed and effectively used as lithium adsorbents. However, the powdered nature of LIS renders them difficult to handle and less recyclable due to their susceptibility to physical loss during post-adsorption retrieval. Therefore, the use of LIS as powdered adsorbents is not economically viable at full-scale application.

To avoid the disadvantages, active studies have been directed toward the immobilization of LIS power on solid supports. Various polymeric materials such as polyvinyl chloride (PVC), polyvinyl alcohol (PVA), polysulfone (PSf), polyurethane (PU) and polyvinylidene fluoride (PVDF) have been used as LIS binders to produce composite $Li^+$ adsorbents in various forms such as granules, macroporous beads, membranes and foams. In order to effectively optimize the adsorbents, however, an improvement should be brought about to resolve problems of high production cost, the generation of secondary wastes during material preparation, and adsorption performance.

RELATED ART DOCUMENT

1. Korean Unexamined Patent Application Publication No. 10-2005-0045792
2. Korean Unexamined Patent Application Publication No. 10-2005-0045793

SUMMARY OF THE INVENTION

The present invention provides a composite nanofiber membrane for the selective adsorption of lithium from seawater, and a method for preparing the same.

Also, the present invention provides a lithium recovery apparatus and method using the composite nanofiber membrane for the adsorption of lithium.

In accordance with an aspect thereof, the present invention provides a lithium recovery apparatus comprising:

a membrane filtration cell, equipped with a composite nanofiber membrane for lithium adsorption, for adsorbing lithium dissolved in seawater onto the membrane and desorbing the lithium by use of an acid solution fed thereto;

a feed tank for supplying seawater to the membrane filtration cell;

a release tank for accommodating the seawater from the membrane filtration cell after lithium adsorption; and a recovery tank for feeding the acid solution to the membrane filtration cell and recovering the lithium desorbed by the acid solution, wherein the composite nanofiber membrane is prepared using a method comprising:

mixing lithium-manganese oxide adsorbent powder with a polymeric material in a solvent to give a viscous dope mixture; and electrospinning the viscous dope mixture.

In one exemplary embodiment, the lithium recovery apparatus may further comprise a peristaltic pump between the membrane filtration cell and the release tank, and between the membrane filtration cell and the recovery tank.

In one exemplary embodiment, the composite nanofiber membrane for lithium adsorption may be detachably attached to the membrane filtration cell.

In one exemplary embodiment, the composite nanofiber membrane for lithium adsorption may be a flat sheet-type filter membrane with pores on a micron scale.

In one exemplary embodiment, the method of preparing the composite nanofiber membrane for lithium adsorption may further comprise thermal treatment.

Advantageous as it is in terms of large surface area per volume, the electrospun composite nanofiber membrane has poor mechanical strength due to its high porosity. Thermal treatment induces physical binding (adherence) between nanofibers of the composite nanofiber membrane, providing excellent strength for the composite nanofiber membrane.

The thermal treatment may be preferably carried out at a temperature less than the melting point of the polymeric material.

In the thermal treatment step, a single sheet or two or more stacked sheets of the nanofiber membrane are thermally treated to make it possible to control the thickness and average pore size of the composite nanofiber membrane for lithium adsorption. That is, the thermal treatment step is to thermally treat a single sheet or two or more stacked sheets of the nanofiber membrane in which the composite nanofiber membrane for lithium adsorption can be controlled in thickness and average pore size by adjusting the number of sheets of the nanofiber membrane.

The preparation method may further include acid treatment to activate lithium adsorption sites or to bestow lithium adsorption performance on the composite nanofiber membrane. When an acid solution is added to the composite nanofiber membrane, lithium is substituted with hydrogen to afford manganese oxide, which leads to activating lithium adsorption sites. Thus, the composite nanofiber membrane can effectively adsorb lithium. As used herein, the term "lithium adsorption site" refers to a portion of the composite nanofiber membrane to which lithium can be adsorbed. The acid treatment may be carried out by immersing the membrane in a diluted acid. For example, the membrane may be immersed overnight in 0.5 M HCl.

The lithium-manganese oxide adsorbent powder may include at least one selected from the group consisting of, but not limited to, $Li_{1.6}Mn_{1.6}O_4$, $Li_{1.33}Mn_{1.67}O_4$, $LiMn_2O_4$ and $LiMnO_2$. So long as it is known as a lithium adsorbent, any powder may be available in the present invention.

As the lithium-manganese oxide adsorbent powder, acid-treated lithium-manganese oxide adsorbent powder may be employed. In this case, the acid treatment for activating lithium adsorption sites or bestowing lithium adsorption performance on the composite nanofiber membrane may be unnecessary. The acid-treated lithium-manganese oxide adsorbent powder may include at least one selected from the group consisting of $H_{1.6}Mn_{1.6}O_4$, $H_{1.33}Mn_{1.67}O_4$, $HMnO_2$, and $HMn_2O_4$.

The lithium-manganese oxide adsorbent powder may be added in an amount of 15~65% by weight, based on the total weight of the polymer and the adsorbent powder. Within the range of the lithium-manganese oxide adsorbent powder, the membrane can exhibit more efficient adsorption performance.

For use in the preparation of the polymeric composite nanofiber membrane, the lithium-manganese oxide powder preferably has a mean diameter of 5 µm or less, and more preferably 1 µm or less. Given too large a diameter, the powder renders the nanofibers poor in mechanical properties, and is apt to be easily separated from the nanofibers during lithium recovery.

The polymeric material may be selected from the group consisting of polysulfone, polyethersulfone, polyacrylonitrile, polyvinylidene fluoride, cellulose acetate, polyvinyl chloride, and a combination thereof, with polysulfone or polyacrylonitrile being preferred. Polysulfone or polyacrylonitrile is most widely used for membrane production partially due to their cost advantage and excellent chemical resistance and durability. However, the polymeric material is not limited to the group. So long as it can be electrospun, any polymeric material can be available for the production of composite nanofibers.

In the present invention, the polymer nanofiber may serve as a binder for the lithium-manganese oxide adsorbent powder. According to the present invention, the lithium-manganese oxide adsorbent powder can be easily handled by electrospinning the lithium-manganese oxide adsorbent powder-added polymer solution to bind the adsorbent powder within the polymer nanofibers.

The solvent may include at least one selected from the group consisting of dimethylformamide, dimethylformaldehyde, tetrahydrofuran, dimethylacetamide, and methylpyrrolidone. For example, a mixture of dimethylformaldehyde and tetrahydrofuran, or dimethylformamide may be used.

As for the amount of the polymer necessary for the electrospinning process, it is dependent on kinds of solvent and polymer used. No limitations are given on the solution if the weight ratio between the polymer and the solvent is suitable for electrospinning. However, the solution preferably has a polymer content of 15~25%, and more preferably 18~25% to the solvent in a weight ratio.

When weight ratio of the polymer is less than 15%, electrospinning of the solution may be likely to form a bead-like structure due to the low viscosity of the solution. This type of structure degrades the porosity and surface area of the nanofibers. In contrast, a polymer solution with a polymer content of 15~25% is well electrospun into nanofibers rather than bead-like fibers, and the nanofibers show proper mechanical strength.

With a smaller diameter, the electrospun nanofiber is generally larger in surface area per volume, but poorer in mechanical strength. The nanofiber useful in the present invention, therefore, preferably ranges in diameter from 200 to 2000 nm.

Electrospinning conditions as well as the viscosity of the polymer solution fall within the scope of the factors that have influences on the diameter of the electrospun nanofibers or on whether the bead-like fibers are formed. For example, a high spinning speed given to the polymer solution results in a large diameter of the nanofibers whereas an increase in the distance between the spinning nozzle and the winding drum or in the electroconductivity of the polymer solution decreases the diameter of the nanofibers. Thus, optimization of electrospinning conditions of the polymer solution is also important to obtain nanofibers in a desired diameter range.

In accordance with another aspect thereof, the present invention provides a lithium recovery method using the lithium recovery apparatus, comprising: treating the composite nanofiber membrane for lithium adsorption, installed in the membrane filtration cell, with an acid; adsorbing lithium onto the membrane by passing seawater through the membrane from the feed tank to the membrane filtration cell; desorbing the lithium from the membrane by supplying an acid solution to the membrane filtration cell while releasing the seawater from the membrane filtration cell to the release tank; and transferring the acid solution containing dissolved lithium to the recovery tank.

The acid treatment that is performed on the nanofiber membrane, installed in the membrane filtration cell, for lithium adsorption is to activate the lithium adsorption sites and to bestow a lithium adsorption function on the composite nanofiber membrane. The acid treatment may be carried out either by detaching the membrane from the membrane filtration cell, immersing the membrane in a diluted acid solution for a predetermined time, and installing the acid-treated membrane in the membrane filtration cell or by circulating a diluted acid solution through the membrane-installed filtration cell to extract lithium from lithium manganese oxide held by the membrane. Other details of the acid treatment are omitted here since they are described above in the lithium recovery apparatus.

When the composite nanofiber membrane prepared using a delithiated lithium-manganese oxide adsorbent powder is installed in the membrane filtration cell, the acid treatment for activating the adsorption sites may be omitted.

In accordance with a further aspect thereof, the present invention provides a method for preparing composite nanofiber membrane, comprising: (a) mixing a lithium-manganese oxide adsorbent powder with a polymeric material in a solvent to give a viscous dope mixture; and (b) electrospinning the viscous dope mixture.

In one exemplary embodiment of the present invention, the method may further include treating the composite nanofiber membrane with an acid after the electrospinning of the viscous dope mixture. The acid treatment may activate lithium adsorption sites or bestow lithium adsorption performance on the composite nanofiber membrane.

The method may further include thermally treating a single sheet or two or more stacked sheets of the nanofiber membrane. By adjusting the number of sheets of the nanofiber membrane to be thermally heated in the thermal treatment step, the composite nanofiber membrane can be controlled in thickness and average pore size.

The thermal treatment may be performed to enhance mechanical properties of the composite nanofiber membrane for lithium adsorption to be prepared.

The lithium-manganese oxide adsorbent powder may include at least one selected from the group consisting of, but not limited to, $Li_{1.6}Mn_{1.6}O_4$, $Li_{1.33}Mn_{1.67}O_4$, $LiMn_2O_4$ and $LiMnO_2$.

As the lithium-manganese oxide adsorbent powder, acid-treated lithium-manganese oxide adsorbent powder may be employed. In this case, the acid treatment for activating lithium adsorption sites or bestowing lithium adsorption performance on the composite nanofiber membrane may be unnecessary. The acid-treated lithium-manganese oxide adsorbent powder may include at least one selected from the group consisting of $H_{1.6}Mn_{1.6}O_4$, $H_{1.33}Mn_{1.67}O_4$, $HMnO_2$, and $HMn_2O_4$.

The polymeric material may be selected from the group consisting of polysulfone, polyethersulfone, polyacrylonitrile, polyvinylidene fluoride, cellulose acetate, polyvinyl chloride, and a combination thereof.

The solvent may include at least one selected from the group consisting dimethylformaldehyde, tetrahydrofuran, dimethylacetamide, methylpyrrolidone, and a combination thereof.

The solvent and the polymer material may be mixed at a ratio of 85~75% by weight:15~25% by weight.

In the mixing step, the lithium-manganese oxide adsorbent powder may be used in an amount of 44~55% by weight based the total weight of the polymer plus the absorbent powder.

With regard to other details of the method for preparing a composite nanofiber membrane for lithium absorption, reference may be made to the description of the lithium recovery apparatus because they are the same as described in the apparatus.

In accordance with a still further aspect thereof, the present invention provides a composite nanofiber membrane for lithium adsorption provided prepared using the method, characterized in that manganese oxide is immobilized within nanofibers.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and other advantages of the present invention will be more clearly understood from the following detailed description taken in conjunction with the accompanying drawings, in which.

DESCRIPTION OF THE EMBODIMENTS

Figure 1:
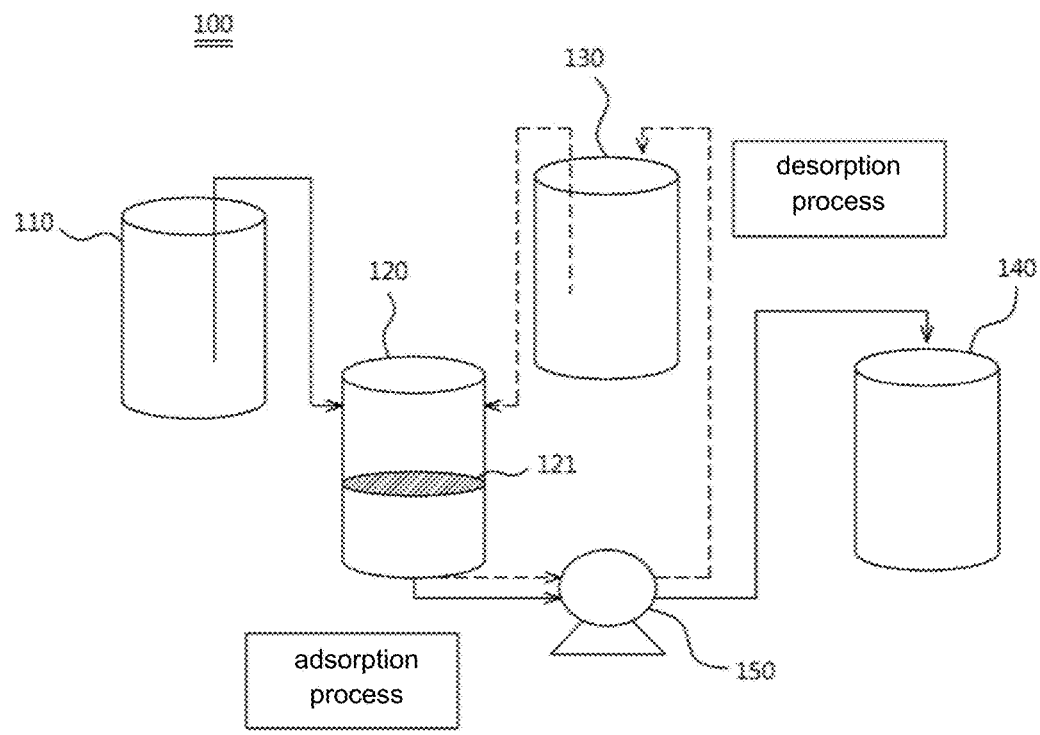
FIG. 1 is a schematic view of a lithium recovery apparatus according to the present invention.

Embodiments of the present invention are described with reference to the accompanying drawings in order to describe the present invention in detail so that those having ordinary knowledge in the technical field to which the present invention pertains can easily practice the present invention. It should be noted that same reference numerals are used to designate the same or similar elements throughout the drawings. In the following description of the present invention, detailed descriptions of known functions and configurations which are deemed to make the gist of the present invention obscure will be omitted.

With reference to FIG. 1, the present invention will be illustrated in detail.

A lithium recovery apparatus 100 according to one exemplary embodiment of the present invention includes a membrane filtration cell 120, equipped with a composite nanofiber membrane 121, in which lithium ions dissolved in seawater are adsorbed to the nanofiber membrane and desorbed from the membrane by an acid solution; a feed tank 110 for providing seawater to the membrane filtration cell 120; a release tank 140 for accommodating the seawater released from the membrane filtration cell 120 after lithium adsorption; a recovery tank 130 for providing an acid solution to the membrane filtration cell 120 and for recovering a solution containing lithium ions desorbed by the provided acid solution. The lithium recovery apparatus 100 may further have a peristaltic pump 150.

In the lithium recovery apparatus 100, an acid treatment process for lithium desorption can be swiftly switched from the adsorption process without the translocation of the adsorbent, thereby facilitating lithium recovery conveniently and effectively.

A better understanding of the present invention may be obtained through the following examples which are set forth to illustrate, but are not to be construed as limiting the present invention.

Example 1: Preparation of LMO/PSf Composite Nanofiber Membrane for Lithium Adsorption Example 1-1

In order to prepare Li$_{1.6}$Mn$_{1.6}$O$_4$ (LMO) as an adsorbent powder, lithium manganate (LiMnO$_2$, mean diameter: <1 μm, >99% trace metals basis) from Sigma-Aldrich was used. Lithium manganate (LiMnO$_2$) was used as a reactant to obtain Li$_{1.6}$Mn$_{1.6}$O$_4$. In this regard, LiMnO$_2$ was thermally treated at 450° C. for 4 hrs in an air condition to afford Li$_{1.6}$Mn$_{1.6}$O$_4$.

As a base of the composite nanofiber membrane, polysulfone (Solvay solexsis, Udel P-3500) was used. For use in electrospinning, a mixture of 2:1 (v/v) dimethylformaldehyde and tetrahydrofuran was prepared. Polysulfone was dissolved at a mass ratio of 18:82 in the mixture solvent. To this solution, Li$_{1.6}$Mn$_{1.6}$O$_4$ was added in 50% of the amount of polysulfone (PSf), and stirred before electrospinning into a composite nanofiber membrane. The electrospinning was carried out as follows. The polymer solution was discharged at a speed of 4 m/h under a supply voltage of 20 kV, with a distance of 120 mm set between a nozzle and a drum winder. The nozzle had a size (OD) of 0.51 mm.

Figure 2:
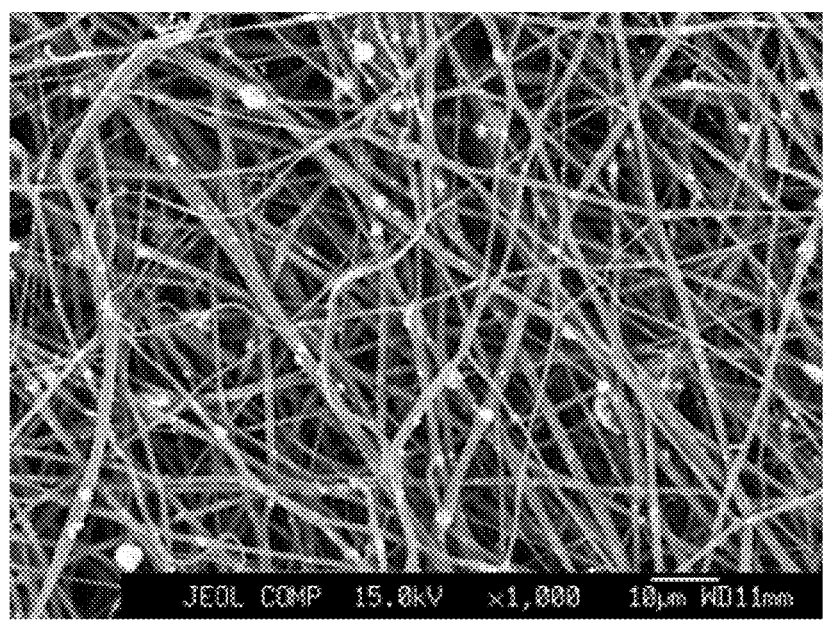
FIG. 2 is an electronic microscope image of a composite nanofiber membrane prepared in Example 1-1.
Figure 3:
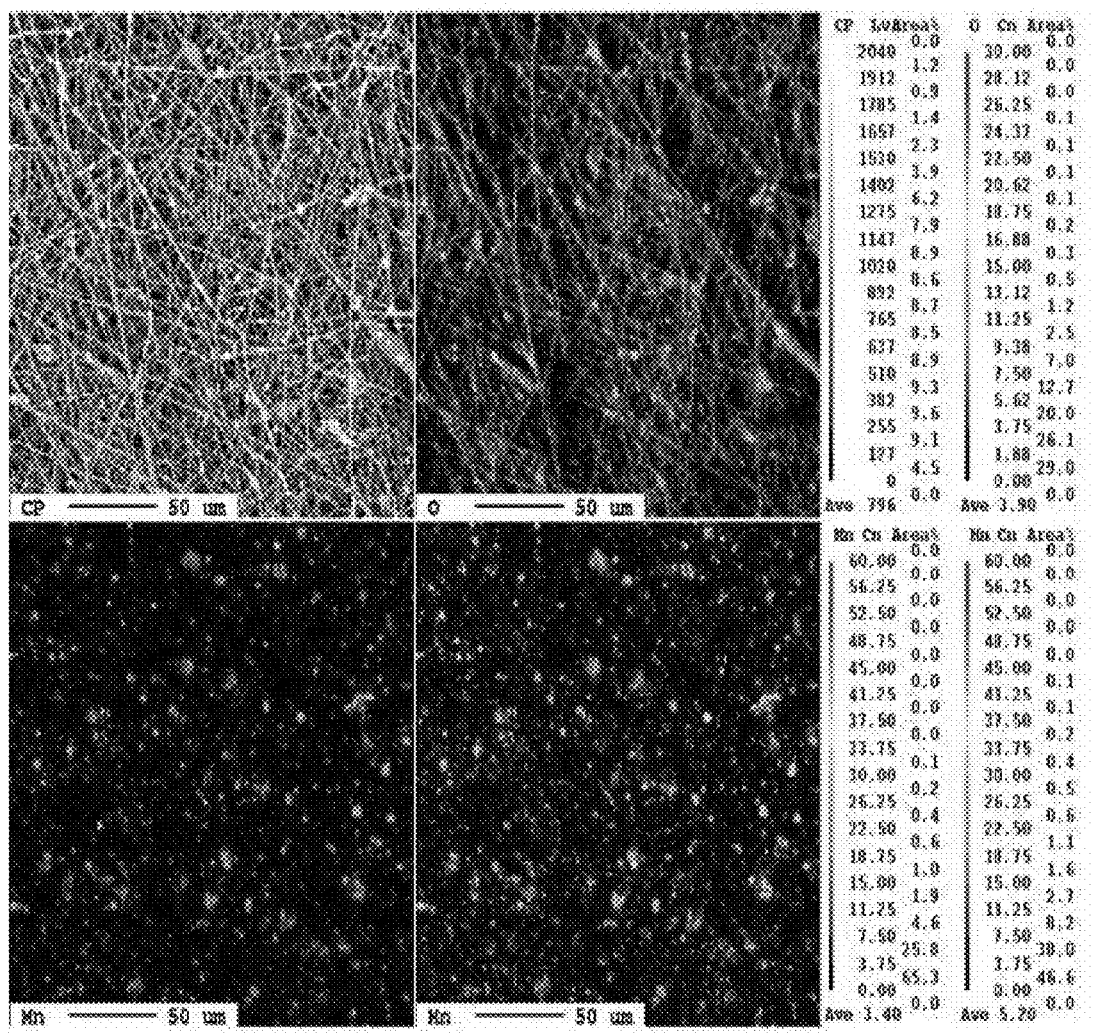
FIG. 3 shows electron microscope images of the composite nanofiber membrane prepared in Example 1-1 after the surface of the membrane is mapped.

In order to completely remove the solvent that yet remained therein, the prepared composite nanofibers were dried for 12 hrs or longer at 60° C. Thereafter, heat treatment for 90 min at 190° C. reinforced the mechanical properties of the composite nanofibers. Using electron probe microanalysis (EPMA) BSE (backscattered electron) images of the membrane were obtained for morphological observation. The result is given in FIG. 2. As can be seen in FIG. 2, the $Li_{1.6}Mn_{1.6}O_4$ powder was well distributed among and supported on the nanofibers. For more accurate analysis, the surface of the membrane was mapped and observed for the distribution of manganese (Mn) and oxygen (O) elements. The results are given in FIG. 3. As can be seen in FIG. 3, the $Li_{1.6}Mn_{1.6}O_4$ powder was homogeneously distributed across the nanofibers.

Examples 1-2 to 1-4

With the exception that different thermal conditions were employed, the same procedure as in Example 1-1 was repeated to prepare composite nanofiber membranes. In Example 1-2, two stacked nanofiber sheets were treated at 190° C. for 90 min while being pressed against Teflon plates at both sides. For Examples 1-3 and 1-4, three and four nanofiber sheets were respectively stacked before the thermal treatment at 190° C. for 90 min with Teflon plates pressing them at both sides.

Test Example 1: Test for Physical Properties of Composite Nanofiber Membrane

An examination was made of changes in physical properties of composite nanofiber membranes with thickness. For this, the membranes prepared in Examples 1-1 to 1-4 were observed for mean pore diameter, bubble point diameter, membrane thickness, tensile strength (MPa), and elongation (%). For measuring mean pore diameters and bubble point diameters, a capillary flow porometer (PMI) was used while tensile strength and elongation were measured with UTM (Universal Testing Machine).

Analysis results of mean pore diameter, bubble point diameter and membrane thickness are summarized in Table 1, below.

As is understood from the data, both the mean pore diameter and the bubble point diameter decreased with an increase in membrane thickness.

It was observed from a mean pore diameter distribution graph that the membrane with a thickness of 0.195 mm (Example 1-1) exhibited the greatest mean pore diameter and that pores with smaller diameters were distributed in thicker membranes. Comparing samples T1 (Example 1-1) and T4 (Example 1-4), the mean pore diameter was reduced two or more times from 3.792 μm to 1.806 μm as the membrane thickness increased two or more times from 0.195 mm to 0.555 mm. Assuming that membranes are homogenous in morphological structure, the matrices within the thicker membranes are more complex, which leads to smaller diameters of pores that penetrate through the cross section. In the present invention, the thickness and mean pore diameter of the composite nanofiber membrane can be controlled through the thermal treatment process.

TABLE 1

| Sample | Mean pore diameter (μm) | Bubble point diameter (μm) | Membrane thickness (mm) |
| --- | --- | --- | --- |
| Ex. 1-1 mono layer(T1) | 3.792 | 7.718 | 0.195 |
| Ex. 1-2 bilayers (T2) | 2.937 | 6.412 | 0.264 |
| Ex. 1-3 trilayers (T3) | 2.158 | 6.110 | 0.486 |
| Ex. 1-4 quadlayers(T4) | 1.806 | 5.394 | 0.555 |

Figure 4:
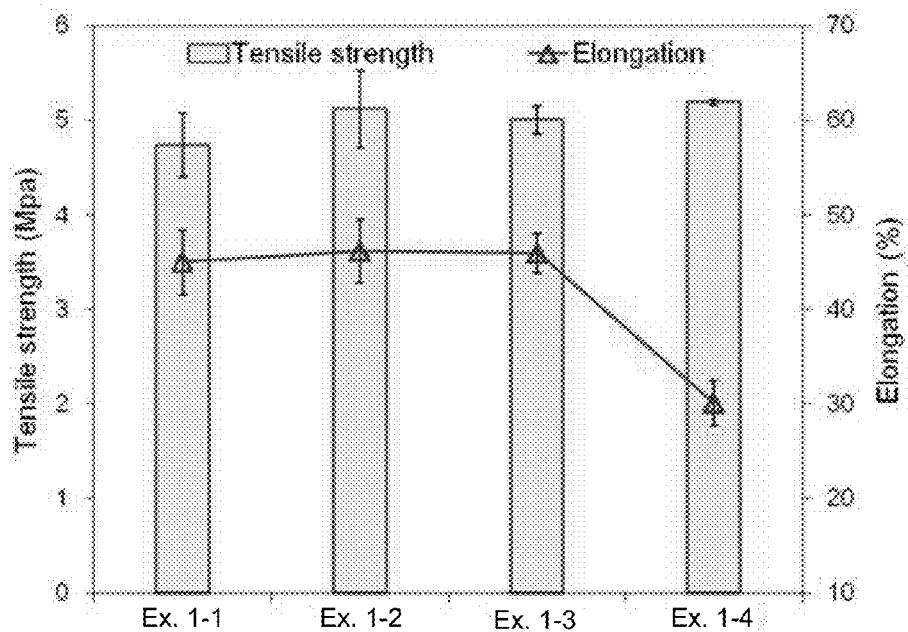
FIG. 4 is a graph in which the membranes prepared in Examples 1-1 to 1-4 are compared with regard to tensile strength and elongation.

The thermally treated composite nanofiber membranes were measured for tensile strength and elongation according to thickness. The results are depicted in FIG. 4. Generally, the tensile strength was observed to remain similar or slightly increase even with an increase in thickness. A tensile strength of 4.7 MPa was measured in the membrane of Example 1-1 (0.195 mm, T1) while the thicker membranes ranged in tensile strength from 5.0 to 5.2 MPa. Elongation was maintained at similar levels of 45~46% over the membranes of Examples 1-1 to 1-3, but decreased to about 30% in Example 1-4 (T4).

Test Example 2: Assay for Lithium Adsorption Efficiency According to Filtration Flow Rate During Lithium Recovery Using Lithium Recovery Apparatus For use in the membrane filtration cell (Amicon cell 8200, Amicon Corporation, USA), the composite nanofiber membrane prepared in Example 1-1 was cut into a circle with a diameter of 60 mm (surface area=28.27 cm²). Lithium adsorption sites of the membrane were activated by immersing the membrane overnight in 0.5M HCl to extract lithium. The acid-treated membrane was installed in the membrane filtration cell that was then connected with a peristaltic pump to induce a negative pressure (−) therein, thereby filtering the influent water through the composite membrane.

The filtered water from the membrane was collected in a tank by operating a pump, and the flow rate was determined as an amount of the filtered water per time. The filtration flow rates were measured to be 17 g/hr and 39 g/hr, respectively, at which experiments were conducted under different conditions. The filtered water was taken at regular time intervals in an amount of 10 mL, and analyzed for lithium level using inductively coupled plasma mass spectrometer (ICP-MS). The raw water (lithium solution) used in this experiment was prepared by adding LiCl to the desalination retentate circulating water ($C_{Li}$=about 0.3 mg/L) generated in the seawater desalination plant to form a final lithium concentration of 3 mg/L.

Figure 5:
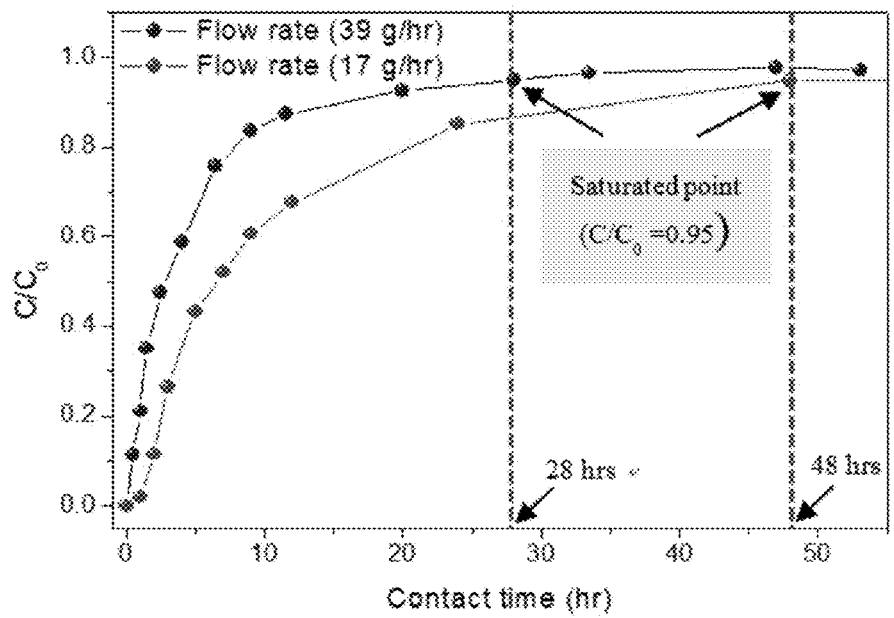
FIGS. 5 and 6 are breakthrough curves illustrating lithium adsorption efficiencies depending on flow rate in lithium recovery using the lithium recovery apparatus of the present invention.
Figure 6:
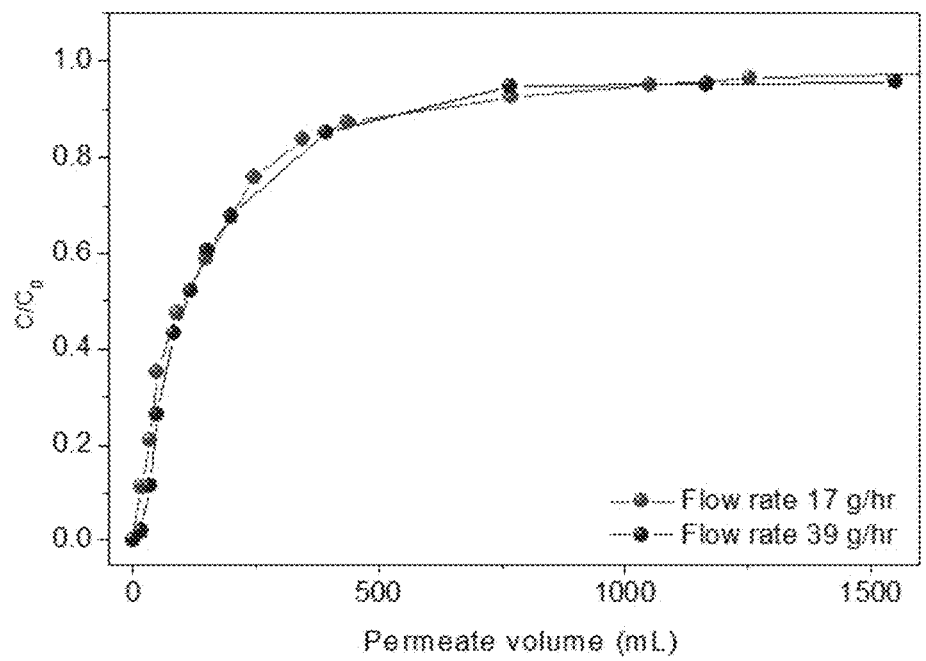

To elucidate lithium recovery behavior according to filtration flow, breakthrough curves were constructed in which lithium ratios of permeate water to influent water were plotted against contact time (filtration time) and permeate volume, as shown in FIGS. 5 and 6, respectively.

In FIG. 5, breakthrough curves are depicted depending on the time for which the raw water was filtered (contact time) at different filtration flow rates. For the sample that operated at a flow rate of 17 g/hr, the adsorption breakthrough of lithium (breakthrough=0.05 $C_0$) occurred within 2 hrs after operation (permeate volume: 33.7 mL), and after 48 hrs of the operation, the ratio reached an adsorption saturation point ($C/C_0$=0.95) (wherein C stands for a lithium ion concentration of permeate water (mg/L), and $C_0$ stands for a lithium ion concentration of influent water (mg/L)). At a flow rate of 39 g/hr, on the other hand, adsorption breakthrough appeared within 30 min, and the ratio arrived at an adsorption saturation point after 28 hrs of the operation. Thus, an increase in the flow rate of raw water reduced the contact time to the adsorption saturation point on the breakthrough curve.

In FIG. 6, breakthrough curves are depicted depending on permeate volumes at different filtration flow rates. The two breakthrough curves were almost coincident with each other. Accordingly, it was found that when the flow rate of raw water increases from 17 g/hr to 39 g/hr, the time taken to recover the same amount of lithium can be reduced without an influence on the breakthrough curve.

Test Example 3: Test for Lithium Adsorption Capability According to Thickness of Composite Nanofiber Membrane The membranes prepared in Examples 1-1 to 1-4 were assayed for lithium adsorption capability. In this regard, the membranes were cut into circles with a diameter of 42 mm (surface area=17.15 cm$^2$) and immersed in 0.5 M HCl (100 mL) for 24 hrs at 30° C. The acid-treated membranes were washed many times with DI water, and mounted to the lithium recovery apparatus. While it was operated at a flow rate of 39 g/hr, the filtered samples were periodically taken in an amount of 10 ml and measured for lithium level using an inductively coupled plasma mass spectrometer (ICP-MS). The raw water used in this test was desalination retentate circulating water (Li conc.=3 mg/L, pH 8).

Figure 7:
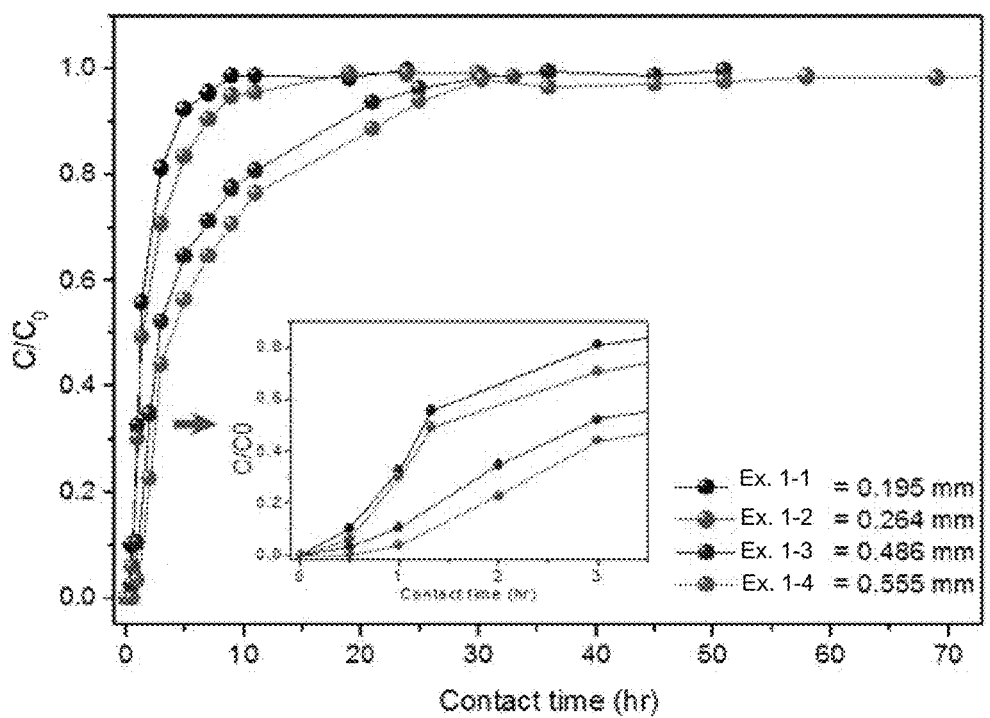
FIG. 7 shows breakthrough curves for the relationship between lithium uptake performance and thickness of the composite nanofiber membrane according to the present invention.

Test results for lithium adsorption capability according to the thickness of the composite nanofiber membrane are depicted in breakthrough curves plotted against contact time of FIG. 7. As can be seen in FIG. 7, a thicker composite membrane exhibited a longer exhaustion time ($C/C_0$=0.95) for which the adsorbent could adsorb lithium. As a rule, it takes a longer time for a thicker membrane to reach an adsorption exhaustion point because it contains more abundant lithium adsorption sites.

Test Example 4: Lithium Adsorption/Desorption Test Using Lithium Recovery Apparatus The composite nanofiber membranes were subjected to a total of five adsorption/desorption cycles to examine the performance sustainability thereof. For use in this experiment, two sheets of the nanofiber membrane were stacked and thermally treated as described in Example 1-2. The thermally treated membrane samples were immersed for 24 hrs at 30° C. in 0.5 M HCl (100 mL). Desalination retentate circulating water (Li conc.=3 ppm) was used as raw water. The final product was oven-dried at 30° C. While raw water was set to pass through the membrane at a flow rate of 39 g/hr, an adsorption process for lithium recovery was operated for 12 hrs so that a total of 468 mL of raw water was allowed to pass through the membrane. After completion of the adsorption process, the permeate water was collected and measured for lithium concentration. DI water was allowed to pass through the membrane at a flow rate of 350 g/hr to remove residual seawater raw water from the composite nanofiber membrane. A desorption process for desorbing lithium from the composite membrane was performed by acid treatment. In this regard, 100 mL of 0.5 M HCl was circulated through the lithium-adsorbed composite nanofiber membrane at a flow rate of 350 g/hr for 10 hrs. Then, the lithium uptake was calculated by measuring a lithium concentration in the acid solution. After the acid treatment, the membrane was washed again with DI water for a flow rate of 350 g/hr for one hour and then subjected to an adsorption process. This cycle was repeated five times.

Figure 8:
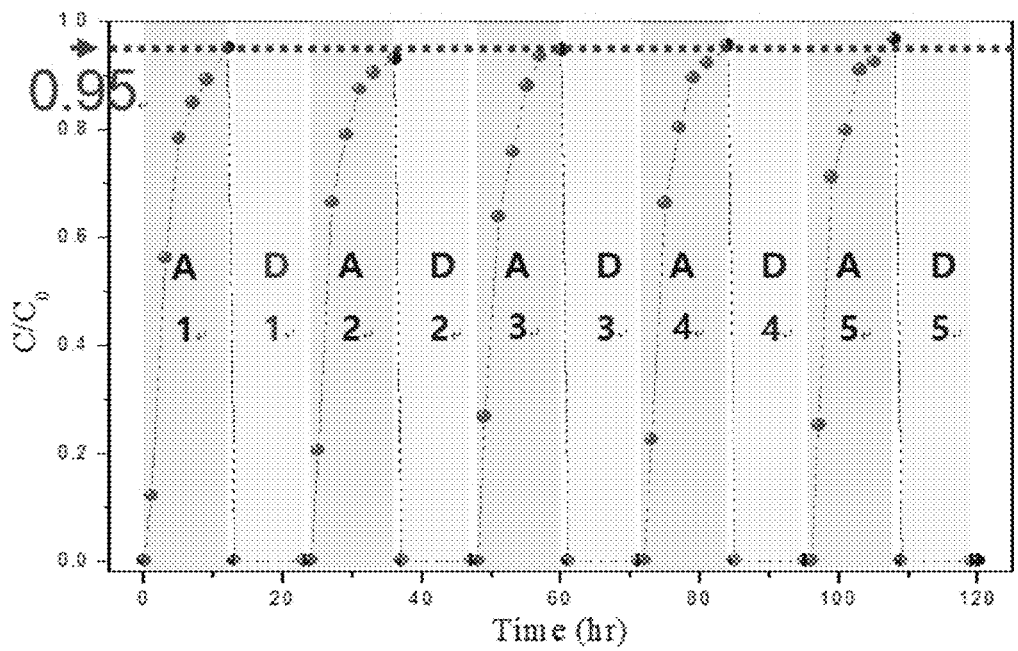
FIG. 8 shows breakthrough curves measured in adsorption/desorption cycles using the lithium recovery apparatus according to the present invention.
Figure 9:
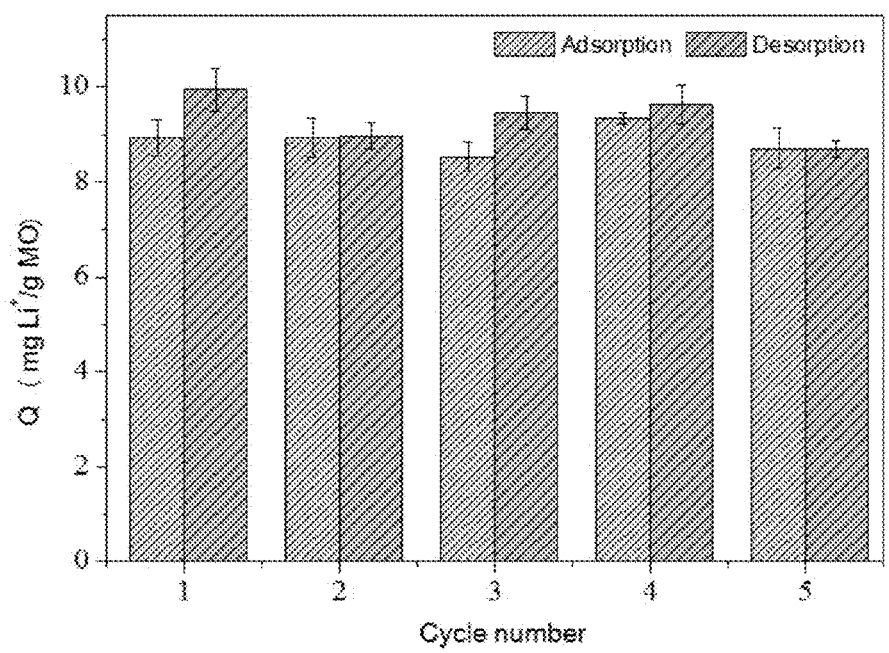
FIG. 9 shows adsorption and desorption amounts of lithium ions according to adsorption/desorption cycle using the lithium recovery apparatus of the present invention.

Test results of the adsorption/desorption cycles of the composite membrane are given in FIGS. 8 and 9, and Table 2. FIG. 8 shows breakthrough curves measured in a total of five adsorption/desorption cycles (wherein A stands for adsorption and D stands for desorption). In all five rounds of the adsorption process, it took 12 hrs or less to reach an adsorption saturation point ($C/C_0$=0.95). The breakthrough curves constructed in 5 rounds of the adsorption process were almost coincident to one another.

As can be seen in FIG. 9 and Table 2, the lithium uptake performance of the membrane in the adsorption process fluctuated only very slightly, with the progression of the adsorption/desorption cycle. Generally, the amount of lithium eluted in the desorption process was measured to be similar to or greater than the uptake. This is because although the membrane was washed with water after the adsorption process, the lithium contained in the seawater still remaining in the membrane was eluted in the desorption process. The Li uptake was measured to be 8.94 mg Li$^+$/g MO in the initial adsorption process and 8.71 mg in the fifth round of the adsorption process, with a Li uptake decrease only by 3% or less. This result indicates that the polysulfone (PSf)/manganese oxide (MO) membrane can be used many times for a long period of time in the adsorption/desorption processes without performance degradation because polysulfone (PSf) chemically stabilizes manganese oxide (MO).

TABLE 2

| | Process Round | 1 | 2 | 3 | 4 | 5 |
|---|---|---|---|---|---|---|
| Adsorption | Li$^+$uptake (mg/gMO)[1] | 8.94 ± 0.37 | 8.92 ± 0.41 | 8.53 ± 0.30 | 9.35 ± 0.11 | 8.71 ± 0.42 |
| | Time (hr) | 12 | 12 | 12 | 12 | 12 |
| | Permeate flow rate (g/hr) | 38.71 | 38.82 | 40.18 | 42.06 | 40.11 |
| | Total permeate volume (mL) | 446.99 | 448.22 | 463.95 | 485.62 | 463.15 |
| Desorption | Li$^+$desorbed (mg/gMO)[2] | 9.95 ± 0.46 | 8.98 ± 0.28 | 9.45 ± 0.35 | 9.64 ± 0.40 | 8.71 ± 0.17 |
| | Time (hr) | 10 | 10 | 10 | 10 | 10 |
| | Circulation flow rate (g/hr) | 350 | 350 | 350 | 350 | 350 |
| | Leaching solution (mL) | 100 | 100 | 100 | 100 | 100 |

[1] calculated from lithium concentrations in influent and permeate water.
[2] amount of leached lithium ions.

Example 2: Preparation of HMO/PAN Composite Nanofiber Membrane

Sample Preparation

As an adsorbent precursor, lithium manganese dioxide ($LiMnO_2$, >99% trace metal basis, particle size <1 μm) was purchased from Sigma-Aldrich (Mo., USA). The polymeric binder PAN (poly(acrylonitrile), MW=150,000 g/mole) was purchased from Sigma-Aldrich (Mo., USA). Dimethylformamide (DMF, >99.5%) from Junsei Chemical Co., Ltd. (Japan) was used as a solvent for PAN dope solution. Heavy metal grades of hydrochloric acid (HCl, RHM 35-37%) and nitric acid (RHM 60% $HNO_3$), both from Junsei Chemical Co., Ltd. (Japan), were used for the delithiation of $Li_{1.6}Mn_{1.6}O_4$ and in acid digestion pre-treatment for elemental analysis, respectively. Lithium hydroxide (LiOH, ≥98%) from Sigma-Aldrich (Mo., USA) and lithium chloride (LiCl, ≥98%) from Fluka (Switzerland) were used for the preparation of simulated $Li^+$ solutions for adsorption experiments. All chemicals were used without further purification.

$H_{1.6}Mn_{1.6}O_4$ Adsorbent Preparation

A commercially available high purity grade $LiMnO_2$ was used as a precursor for the preparation of $H_{1.6}Mn_{1.6}O_4$. The $LiMnO_2$ was heat-treated in a furnace ramped at 10° C./min and then held for 4 hr in air at 450° C. The cooled $Li_{1.6}Mn_{1.6}O_4$ product (LMO) was ground with mortar and pestle, and then screened using Standard Testing Sieve No. 200 (Aperture=75 mm, Chung Gye Sang, Seoul Korea) to obtain a more homogenous particle size distribution. The sieved LMO (1.5 g) was then dispersed in 2 L of 0.5 M HCl solution to facilitate LMO delithiation via $Li^+/H^+$ ion exchange. After one day of leaching, the final product $H_{1.6}Mn_{1.6}O_4$ (HMO) was collected via vacuum filtration, washed repeatedly with deionized (DI) water to rinse off residual acid and then oven-dried at 30° C. The dried HMO adsorbent was retrieved from the filter paper, weighed and then used for nanofiber preparation or stored in a desiccator.

Preparation of HMO/PAN ($H_{1.6}Mn_{1.6}O_4$/Polyacrylonitrile) Composite Nanofiber Membrane A predetermined amount of $H_{1.6}Mn_{1.6}O_4$ (HMO) adsorbent powders, which corresponded to 20, 40, or 60 weight % based on the total weight of polyacrylonitrile (PAN) and $H_{1.6}Mn_{1.6}O_4$ (HMO) to be used was dispersed in dimethylformamide at 60° C. for 2 hrs with stirring, followed by the addition of polyacrylonitrile, and the agitation of the mixture for 4 hrs and then again agitation at room temperature for an additional 4 hrs to give a viscous dope mixture.

The polyacrylonitrile is preferably used at a weight ratio of 1:9 with the solvent. However, the weight ratio between polymer and solvent is not limited to this, and may vary depending on the kind of the polymer.

Composite nanofiber membranes (PAN/$H_{1.6}Mn_{1.6}O_4$) were fabricated from 15 mL of the dope solution. In this regard, the solution was transferred into a 20 mL polypropylene syringe and delivered through a needle with an inner diameter of 0.51 mm into an electrospinning machine (Model: ESP200D/ESP100D, NanoNC Co., Ltd., South Korea) at a constant flow rate of 4 mL/h using a syringe pump (KD Scientific 750, South Korea). The voltage between the needle and the collector was controlled at 22-25 V. An optimal distance between the needle and the collector for the formation of well-structured nanofibers was determined to be 100 mm. The drum-roll type nanofiber collector was rotated at 500 rpm to achieve a uniform mesh thickness. The collected nanofibers were vacuum-dried at 60° C. for one day and stored in moisture-free zip-lock bags. For characterization and experimental use, the samples were cut into the required dimensions, and weighed (see Table 3).

TABLE 3

Conditions for Formation of Nanofiber Membrane

| Parameter | Value |
|---|---|
| Dope solution | |
| Polymer | PAN |
| Polymer concentration | 10 wt % |
| Solvent | DMF |
| Inorganic adsorbent fillers | $H_{1.6}M_{1.6}O_4$(HMO) |
| HMO loading in PAN | 20, 40, 60 wt % |
| Electrospinning conditions | |
| Dope solution volume (mL) | 15 |
| Syringe pump speed (mL/hr) | 4 |
| Voltage (kV) | 22-25 |
| Needle inner diameter (mm) | 0.51 |
| Ndeedle tip-collector distance (mm) | 100 |
| Collector | Drum roll type |
| Collector rotation speed (RPM) | 500 |
| Nanofiber drying temperature (° C.) | 60 |
| Nanofiber drying time (day) | 1 |

Example 3: Preparation of HMO/PSf Composite Nanofiber Membrane

The same procedure as in Example 2 was repeated, with the exception of using the different polymer.

Example 4: Preparation of HMO/PVDF Composite Nanofiber Membrane

The same procedure as in Example 2 was repeated, with the exception of using the different polymer.

Comparative Example 1: Preparation of PAN Nanofiber Membrane

A dope solution was prepared in the same manner as in Example 2, but for not using the $H_{1.6}Mn_{1.6}O_4$ (HMO) adsorbent powder. From the dope solution, a pure PAN nanofiber membrane was prepared as described in Example 2.

Test Example 5: Assay for Physical Properties of HMO/PAN Composite Nanofiber Membrane Structural properties of the prepared HMO sample were determined using an X-ray diffractometer (PANalytical X'pert-Pro, The Netherlands) with a Cu Kα source. Analysis was performed at a slow step scan rate (3 s, 0.02 step in 2q/count) applied with a beam voltage of 40 kV and a current of 30 mA. Surface morphologies of HMO and PAN nanofibers (Pt coated) were observed under Scanning Electron Microscope equipped with Energy Dispersive X-ray Spectrometer (SEM-EDX, Hitachi S-3500 N, Japan). Mechanical properties of the nanofibers were determined using Universal Testing Machine (UTM LFPlus, Lloyd Instruments, UK) equipped with a 1 KN load cell. The samples (20 mm×50 mm) were pre-loaded with 0.02 kg-f and were analyzed at a cross-head speed of 50 mm/min. Pore size distributions of the nanofiber sheets were acquired using a capillary flow porometer (CFP-1200AE, Porous Materials, Inc., USA). The samples were tested at dry-up/wet-up mode using Galwick (surface tension: 15.9 dynes/cm) as a wetting agent. True densities of the prepared materials were measured using a pycnometer method. Bulk densities, porosities and water absorption capacities were analyzed according to the known methods. Nanofiber diameters were measured via SEM image processing using SigmaScan Pro 4.0 software.

Actual HMO loadings in HMO/PAN were determined thermogravimetrically using a digital muffle furnace (Wiser Therm FP05, Germany). Moisture-free pre-weighed HMO/PAN samples were heated at 700° C., 10° C./min for 4 hrs to degrade PAN. The mass differences before and after thermal degradation were accounted as HMO content.

Inductively coupled plasma mass spectrometry (ICP-MS Agilent 7500 series, USA) was used for HMO elemental compositional analysis using ultra high purity Argon (99.999%) as carrier gas.

Figure 10:
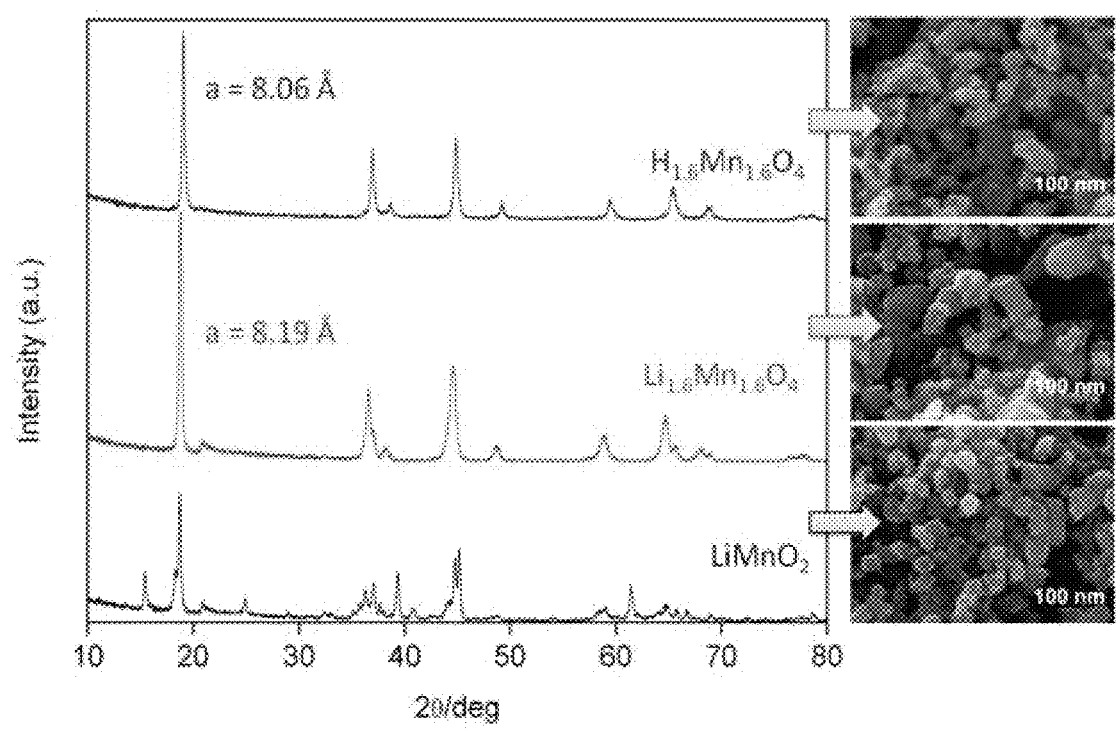
FIG. 10 shows XRD spectra and SEM images of $LiMnO_2$, LMO ($L_{1.6}Mn_{1.6}O_4$), and HMO ($H_{1.6}Mn_{1.6}O_4$) powders.
Figure 11:
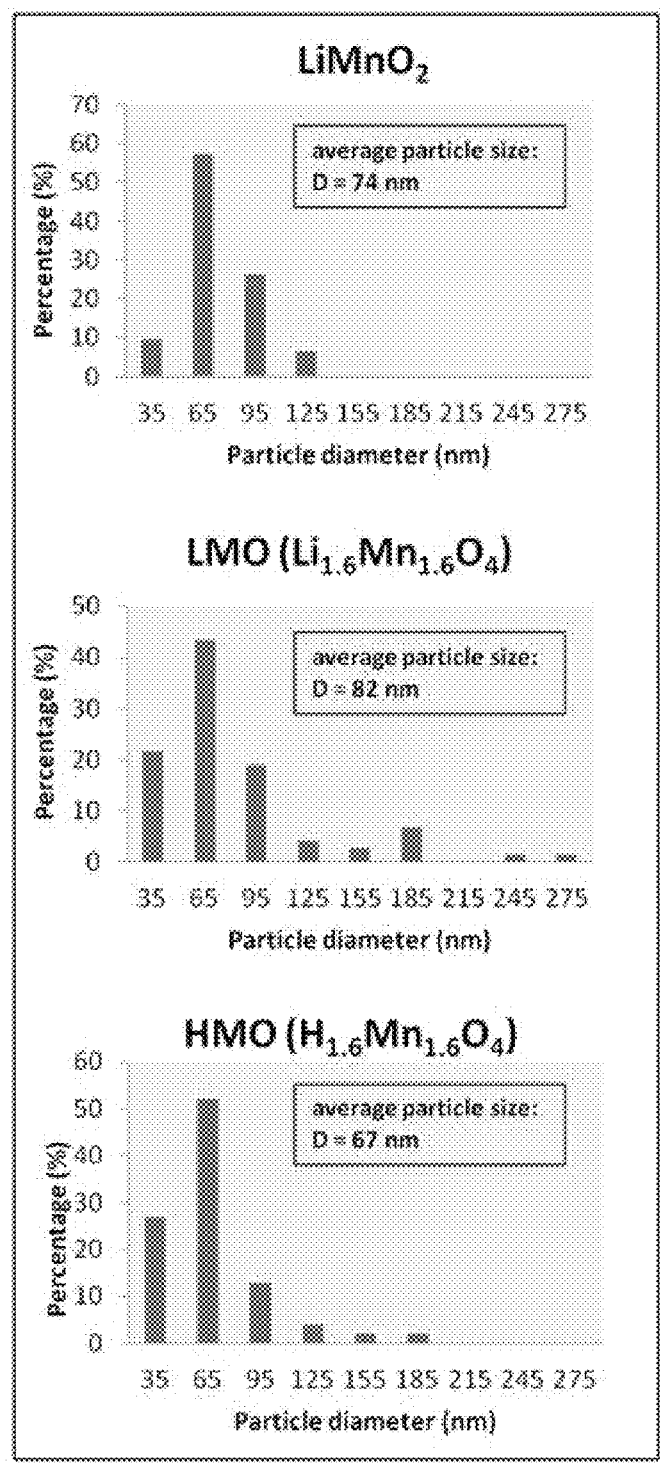
FIG. 11 shows particle size distributions of LMO and HMO powders.

FIG. 10 shows XRD and SEM analysis results for morphologies of the adsorbent powder. FIG. 11 shows particle size distributions of adsorbent particles. Heat-treated LMO particles had more defined edges and became slightly larger in mean particle size than the precursor LiMnO2, suggesting a very slight particle growth and agglomeration due to calcination. After acid treatment, HMO particles remained cubic but with a particle size distribution similar to that of $LiMnO_2$ (see FIG. 11). Nonetheless, the prepared LMO and HMO were nearly consistent in morphology with those reported previously.

XRD results confirmed the successful preparation of HMO from commercial $LiMnO_2$ via thermal treatment and subsequent delithiation, as shown in FIG. 10. XRD patterns of $LiMnO_2$ in FIG. 10 are nearly identical with those reported previously, which can be indexed to the orthorhombic crystal system (JCPDS No. 35-0749) with Pmnm space group. Thermally treated $LiMnO_2$ at 450° C. resulted in the formation of cubic $Li_{1.6}Mn_{1.6}O_4$ or LMO with lattice constant a=8.19 Å. The delithiated LMO or HMO revealed similar pattern as compared with those in earlier reports, which could be indexed to a face-centered cubic system with a=8.06 Å. The similar XRD patterns of LMO and HMO indicates a topotactic replacement of $Li^+$ with $H^+$ during acid treatment, and also explains the nearly unaltered crystal structure of the adsorbent.

Figure 12:
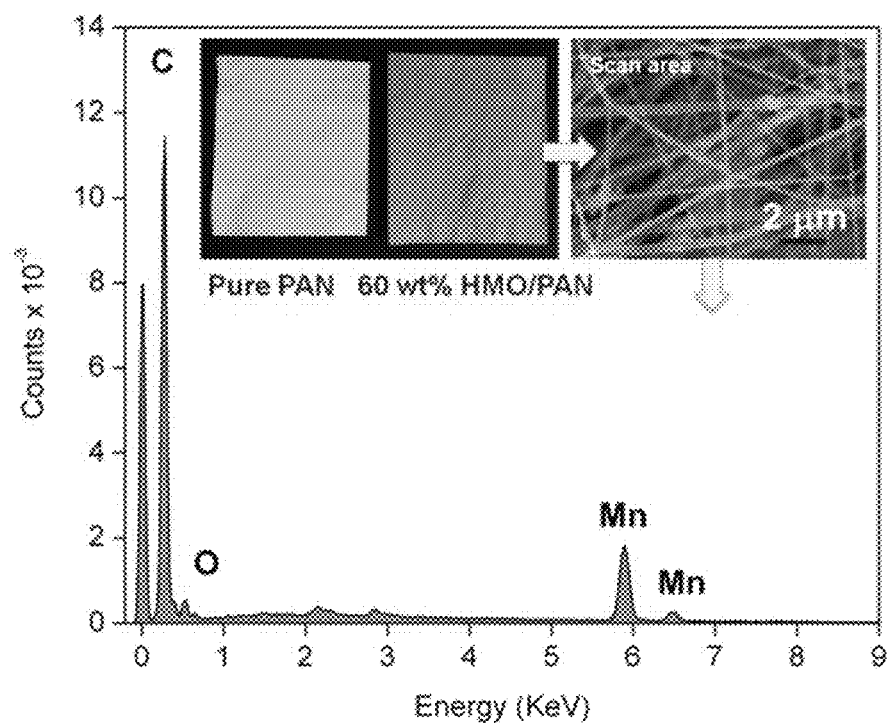
FIG. 12 shows optical images of the HMO/PAN ($H_{1.6}Mn_{1.6}O_4$/polyacrylonitrile) composite nanofiber membrane and the PAN nanofiber membrane, together with SEMEDX patterns of the HMO/PAN composite nanofiber membrane.

FIG. 12 shows an opaque white pure PAN nanofiber in contrast to the light brown composite HMO/PAN nanofiber. The HMO/PAN SEM image (i.e. scan area for EDX mapping) of FIG. 12 reveals the presence of particles with varying sizes in the nanofiber. The EDX spectrum confirmed that these particles are the HMO adsorbents as indicated by the Mn and O peaks. It is also apparent from the SEM images of HMO/PAN composite nanofiber membrane in FIG. 12 that HMO aggregates (≥0.5 μm) having larger diameters than those of the nanofibers (<500 nm) either protruded on the surface or billowed across the fiber width.

Figure 13:
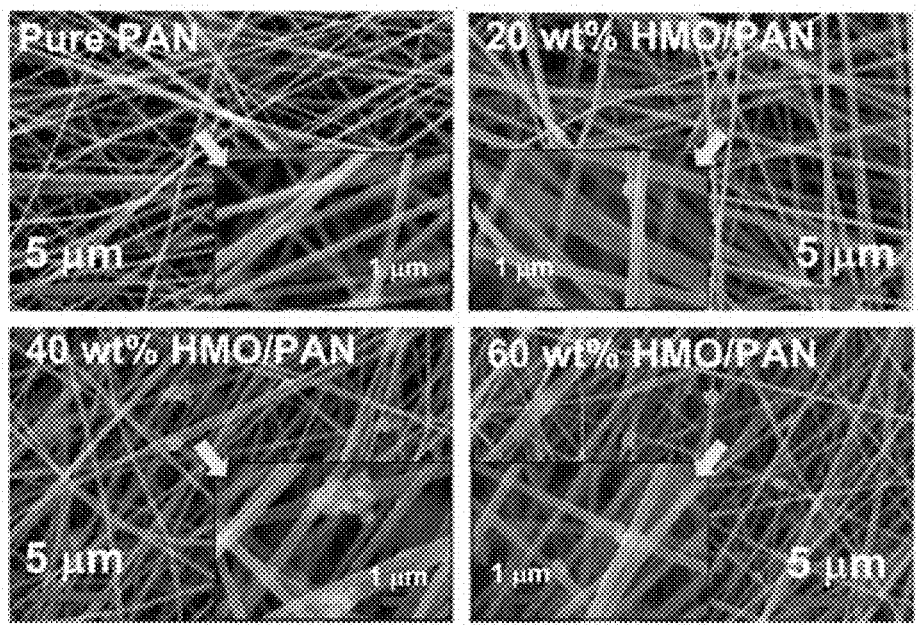
FIG. 13 shows SEM images of HMO/PAN composite nanofiber membranes with 20, 40, and 60 wt % HOM loading, and a pure PAN nanofiber membrane.
Figure 14:
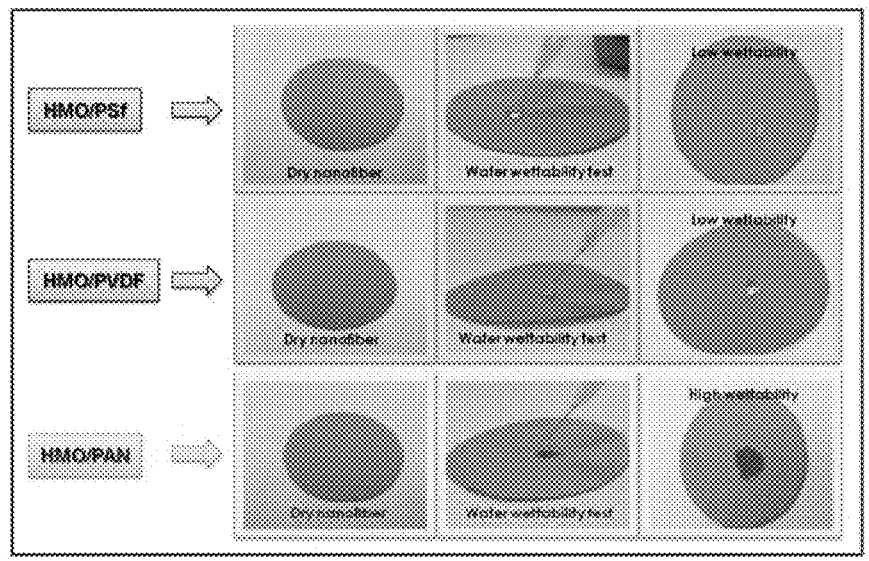
FIG. 14 is a view illustrating the comparison of wettability among HMO/PAN, HMO/PSf, and HMO/PVDF composite nanofiber membranes.
Figure 15:
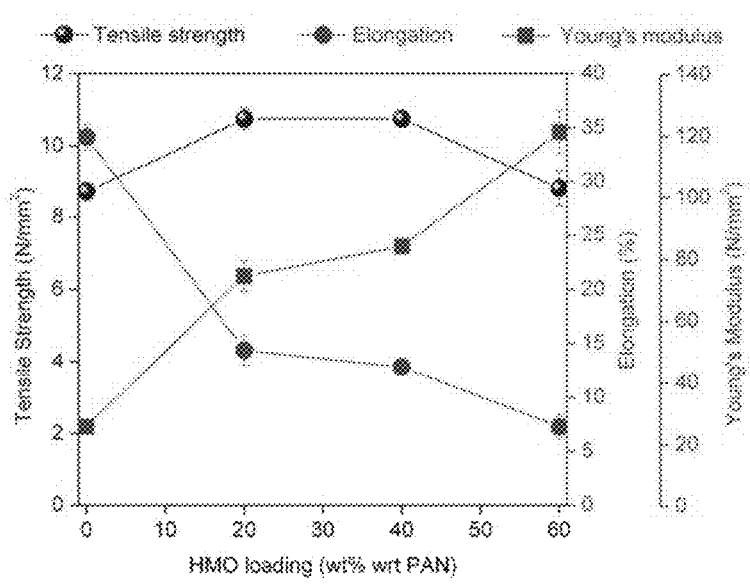
FIG. 15 is a graph showing mechanical properties of HMO/PAN composite nanofiber membranes with 20, 40, and 60 wt % HMO loading, and a pure PAN nanofiber membrane.

The properties of HMO/PAN composite nanofiber membranes with various HMO loadings are analyzed and shown in FIGS. 13, 14 and 15, and Table 4. With reference to FIG. 13, the HMO/PAN composite nanofiber membrane was well structured without the formation of bead-like shapes. On the whole, since nanofibers with bead-like morphology weaken linkages of the polymer, such structural morphologies render the nanofibers heterogeneous in diameter, disturbing the dispersion of $H_{1.6}Mn_{1.6}O_4$ particles or making the polyacrylonitrile binder thick around the adsorbed particles.

Generally, when the binder that functions to fix the adsorbent increases in thickness, the adsorbent in mixture with the binder may significantly reduce the adsorption performance of the composite nanofiber membrane, compared to binder-free $H_{1.6}Mn_{1.6}O_4$ particles. In one exemplary embodiment of the present invention, the nanofibers have a diameter of <300 nm, but do not take a bead form thanks to a highly concentrated PAN solution and a high molecular weight of PAN. These two factors are believed to improve the entanglement of polymer chains during electrospinning. In addition, large $H_{1.6}Mn_{1.6}O_4$ particles are easily observed with the increasing of the HMO content because the HMO particles are more prone to aggregation and protrusion.

TABLE 4

Physico-chemical characterization of PAN/HMO.

| Material | True density (g/cm³) | Bulk density (g/cm³) | Ave fiber diameter (nm) | Porosity (%) | Water Content (%) |
|---|---|---|---|---|---|
| HMO | 3.21 ± 0.11 | — | — | — | — |
| Pure PAN | 0.99 ± 0.05 | 0.65 ± 0.04 | 233 ± 30 | 64 | 80 |
| 20 wt % HMO/PAN | 1.09 ± 0.07 | 0.57 ± 0.02 | 250 ± 18 | 60 | 77 |
| 40 wt % HMO/PAN | 1.30 ± 0.08 | 0.48 ± 0.02 | 266 ± 26 | 52 | 75 |
| 60 wt % HMO/PAN | 1.38 ± 0.10 | 0.43 ± 0.03 | 290 ± 25 | 49 | 74 |

Along with the structural differences (see FIG. 13) among the composite nanofibers with different HMO loadings are the variations in their physico-chemical properties as listed in Table 4. Nanofiber density increased with HMO loading since HMO particles are denser than PAN. The average nanofiber diameter also increased with an increase in the content of HMO adsorbents. An increase in nanofiber diameter reduces the interstitial spaces (i.e. source of macroporosity of nanofibers) among the fibers. Compared to PAN, HMO probably has lower affinity for water, so that a decline in water adsorption capacity of HMO/PAN was observed as HMO loading was increased. Nonetheless, all HMO/PAN composite nanofiber membranes retained best wettability as analyzed for the composite nanofiber membranes according to Examples 2, 3 and 4 (see FIG. 14), suggesting that the HMO/PAN composite nanofiber membranes could be brought into good contact with adsorbent-$Li^+$ sources.

The effect of HMO loading on the mechanical property of HMO/PAN composite nanofibers was examined. As can be seen in FIG. 15, the HMO/PAN nanofibers that had larger diameters with an increase in adsorbent loading (20- and 40 wt %) exhibited better tensile strengths. This indicates the different mechanical behavior of composite nanofiber from that of the as spun pure PAN. The adsorbent particles well dispersed in the fibers can reinforce physical properties by interaction with PAN. At 60 wt % HMO loading, HMO aggregation became more remarkable as more and larger adsorbents are apparent on the fiber surface. Aggregate protrusions might have caused micro-defects in the nanofiber structures that mechanically weakened the composite, but the composite remained strong enough, like pure PAN nanofiber. Furthermore, increased HMO addition resulted in less flexible and more rigid composite fibers as evidenced by the reduced elongation and enhanced Young's modulus, respectively. Nonetheless, all HMO/PAN composites did not exhibit significant physical deterioration attributable to HMO addition. All composite nanofiber membranes were found to be mechanically suitable.

Test Example 6: Analysis for $Li^+$ Uptake Performance of HMO/PAN Composite Nanofiber Membrane All adsorption experiments were performed at 25° C. (298 K) unless otherwise stated. The effect of PAN as a binder on the HMO adsorption capacity was determined through equilibrium adsorption experiments. Pre-weighed dry $H_{1.6}Mn_{1.6}O_4$ (HMO) adsorbent particles (40 mg), polyacrylonitrile (PAN 240 mg), and HMO/PAN composite nanofiber membranes with different $H_{1.6}Mn_{1.6}O_4$ HMO loadings (sample masses: 20 wt %; 40 wt %, and 60 wt %) were soaked in a 45 mL simulated $Li^+$ solution and placed in a shaking incubator (200 rpm) for 24 hrs at 30° C. Different concentrations of pure $Li^+$ solutions with a fixed initial pH of 11 were prepared from 1 mM LiOH with varied LiCl additions (7-35 mg/L). Equilibrium $Li^+$ adsorption capacity ($Q_e$) was quantified using the following Equation (1) (Co: initial $Li^+$ concentration, Ce: final (equilibrium) $Li^+$ concentration, V: sample volume and m: mass of dry HMO)

$$Q_e = \frac{(C_o - C_e) \times V}{m} \quad (1)$$

The recyclability of the composite HMO/PAN nanofibers was also tested using 35 mg/L solution at initial pH=11. After each adsorption cycle, the nanofibers were statically soaked in 45 mL 0.5 mM HCl solution for 24 hr at 30° C. to desorb $Li^+$. The regenerated HMO/PAN was subsequently washed with DI water until neutral pH of washing solution is achieved. The washed HMO/PAN was gently pressed between Kimwipes® to remove residual water, and was used for the next adsorption cycle. Adsorption-desorption cycles were repeated up to 10 times.

Adsorption experiments in real seawater desalination retentate (each 1 L sample was spiked with 15 mg LiCl) were also conducted to investigate the effect of competing ions such as $Na^+$, $K^+$, $Ca^{2+}$ and $Mg^{2+}$ on the $Li^+$ uptake and separation performance of HMO and composite HMO/PAN nanofibers.

Collected samples (20 mL) from adsorption experiments were passed through 0.2 μm Nylon syringe filters. For metal analysis, 10 mL aliquots were acid digested with nitric acid (5 mL 60% $HNO_3$) in a MARS-5 microwave oven (CEM, USA). The digested samples were transfer-filtered in 100 mL polypropylene volumetric flasks and the filters were washed several times with DI water to ensure complete collection of analytes. The samples were diluted with DI water as needed before ICP-MS analysis. The remaining aqueous samples were used for pH measurements using Schott instruments pH probe (Z451 SI analytics GmBH, Germany) in Orion 4 star pH meter (Thermo Electron Corporation, USA).

Analysis for $Li^+$ Adsorption Performance of HMO Powder

From theoretical calculations, one gram of $L_{1.6}Mn_{1.6}O_4$ or LMO contained 68.1 mg of lithium and 539.2 mg of manganese. In actual elemental analysis, slightly lower values of 65.1 mg Li/g and 509.0 mg Mn/g HMO were obtained; this corresponds to a nearly equimolar Li/Mn ratio (0.97). The $Li^+$ adsorption capacity of HMO is dependent on the delithiation efficiency of $Li_{1.6}Mn_{1.6}O_4$. The maximum attainable $Li^+$ uptake of the HMO prepared according to one exemplary embodiment of the present invention was estimated to be 54.6 mg/g, a very close estimate with those reported in an earlier study Equilibrium adsorption results of HMO powder in an unbuffered pure $Li^+$ solution is shown in FIG. 16a. As observed in a previous work, the highest $Li^+$ uptakes by HMO powders were recorded at pH>11. Hence initial pH of $Li^+$ solutions were fixed at this pH level (X. Shi, D. Zhou, Z. Zhang, L. Yu, H. Xu, B. Chen, X. Yang, Synthesis and properties of $Li_{1.6}Mn_{1.6}O_4$ and its adsorption application, Hydrometallurgy 110 (2011) 99-106). As the initial $Li^+$ concentration is increased, $Q_e$ steadily increased before it finally reached a maximum value of 10.8 mg/g at Co=35 mg $Li^+$/L. The obtained $Q_e$ is comparable with that reported in earlier work, which also used HMO as an adsorbent, wherein $Q_e$=11.1 mg $Li^+$/g was obtained at initial pH=11.6.

Figure 16:
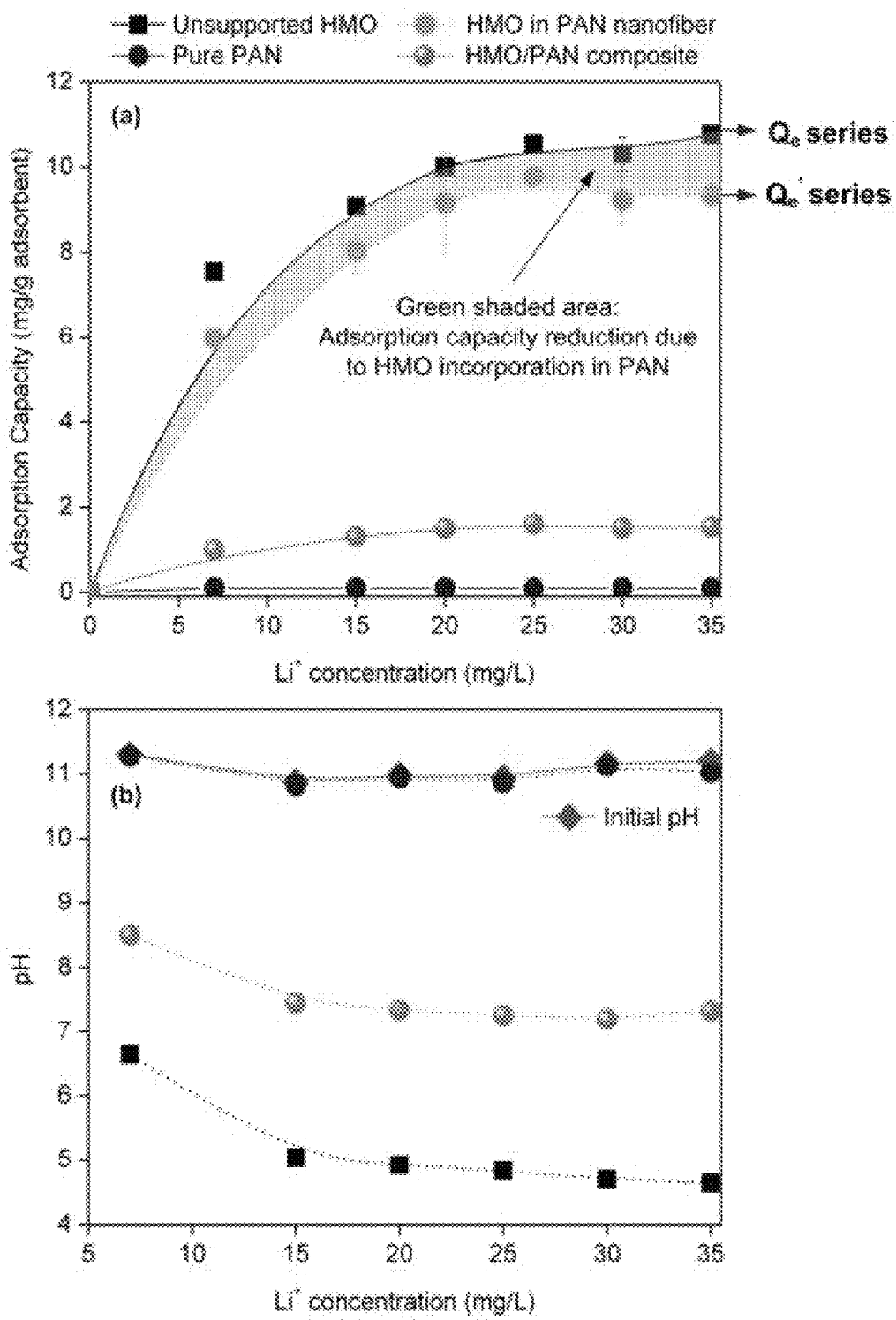
FIG. 16 shows equilibrium adsorption results of HMO powder, a HMO/PAN composite nanofiber membrane (20 wt % HMO loading), and a pure PAN nanofiber membrane: (a) adsorption capacity vs. lithium ion concentration, (b) pH vs. lithium ion concentration.

In FIG. 16, equilibrium pH values were inversely related to $Q_e$ values; the lowest pH=4.65 was obtained at the highest $Q_e$. $Li^+$ uptake predominantly occurred at the H+ ion exchange sites as shown in the following Equation. (2); $Li^+$ reinsertion in the HMO was concomitant with the release of H+ in the aqueous stream. Equation (2) suggests that continued increase in aqueous H+ concentration could limit $Li^+$ insertion in the HMO. Thus, in an unbuffered system, the maximum attainable $Li^+$ adsorption capacity of HMO powder was not attained due to proton inhibition.

$$H_{1.6}Mn_{1.6}O_4 + Li^+(aq) \leftrightarrow Li_{1.6}Mn_{1.6}O_4 + H^+(aq) \quad (2)$$

$Li^+$ Adsorption Performance of HMO/PAN Composite Nanofiber Membrane

FIG. 16 shows results of equilibrium adsorption experiments of HMO/PAN that were performed to determine the effect of PAN nanofibers as HMO binder. As can be seen FIG. 16a, a pure PAN nanofiber membrane was revealed to have no $Li^+$ adsorption capability. In the HOM/PAN composite, only a very low adsorption capability was detected. Herein, the term "HMO/PAN composite" refers to a mixture of HMO and PAN before preparation into nanofibers. As seen in FIG. 16a, there is a great difference in adsorption capability between the HMO/PAN composite and the HMO/PAN composite nanofiber membrane (HMO in PAN nanofiber, indicating that HMO does not function as an adsorbent due to burial between PAN, but preparation into nanofibers causes the exposure of HMO on fiber surface, resulting in improved adsorption performance.

To accurately observe the effect of PAN on the adsorption performance of dispersed HMO, $Q_e$ was transformed as $Q_e'$. The re-plotted $Q_e'$ series in FIG. 16a shows lower values than those of the $Q_e$, which may be attributed to the loss of HMO adsorption sites due to its binding with PAN. Equilibrium adsorption loss was estimated as % $Q_e$ loss in Eq. (3) that pertains to the percentage of discrepancy between $Q_e$ and $Q_e'$. In this Test Example, a $Q_e$ loss by 6-22% was measured from 20 wt % HMO in PAN nanofiber at all Co tested.

$$\% Q_e \text{ loss} = \frac{(Q_e - Q_e')}{Q_e} \times 100 \quad (3)$$

The benefit of using PAN nanofibers as solid support of HMO is clearly observed in FIG. 14. Compared to other polymeric binders such as PVC, PU, and PSf (polysulfone), PAN is a relatively hydrophilic polymer. Accordingly, in case of using PAN, contact between adsorbent (adsorption membranes) and water-soluble $Li^+$ becomes easy. As shown in FIG. 14, PAN nanofibers demonstrated good wettability and fast water absorption without apparent swelling while maintaining its mechanical stability. Furthermore, the fiber diameters were almost in the same order as the HMO particle size. This provides a relatively higher probability for the HMOs to be exposed on the fiber surface, which minimizes surface blockage of HMOs by PAN binder, thereby alleviating $Q_e$ loss.

Figure 17:
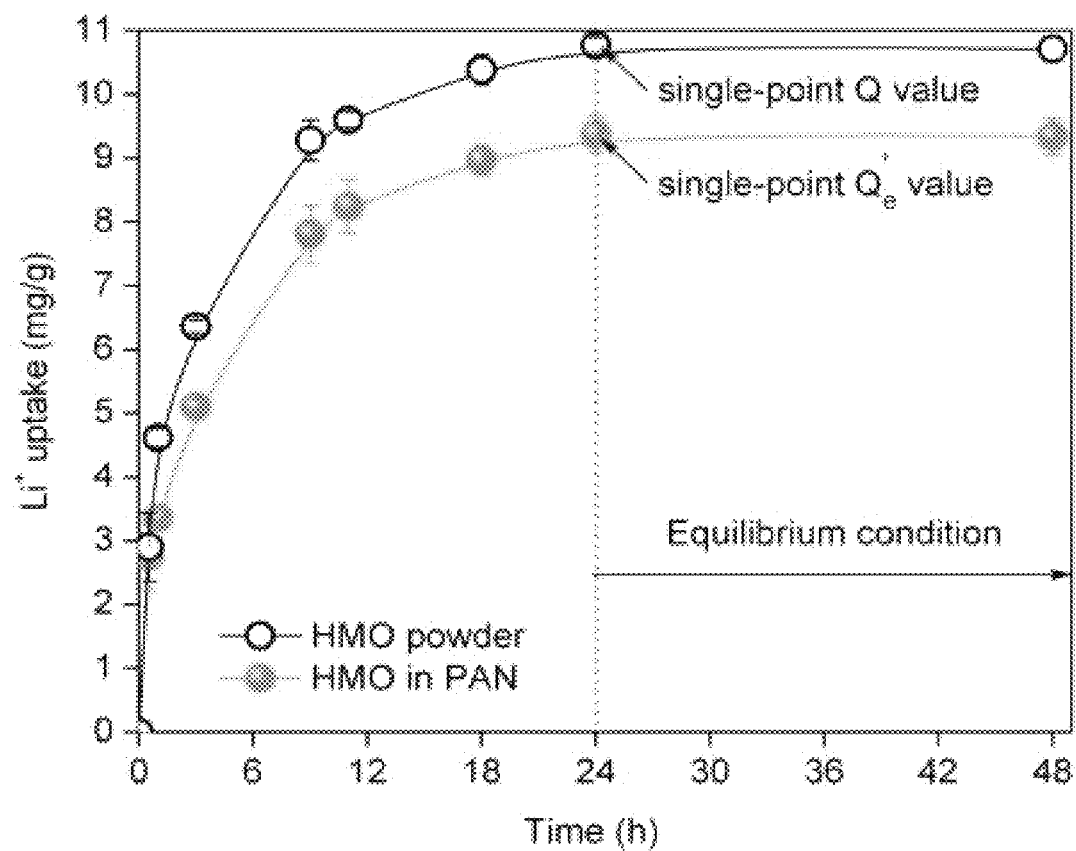
FIG. 17 is a graph in which the comparable $Li^+$ adsorption rates of HMO powder and HMO/PAN (20 wt % HMO loading) are plotted against time.
Figure 18:
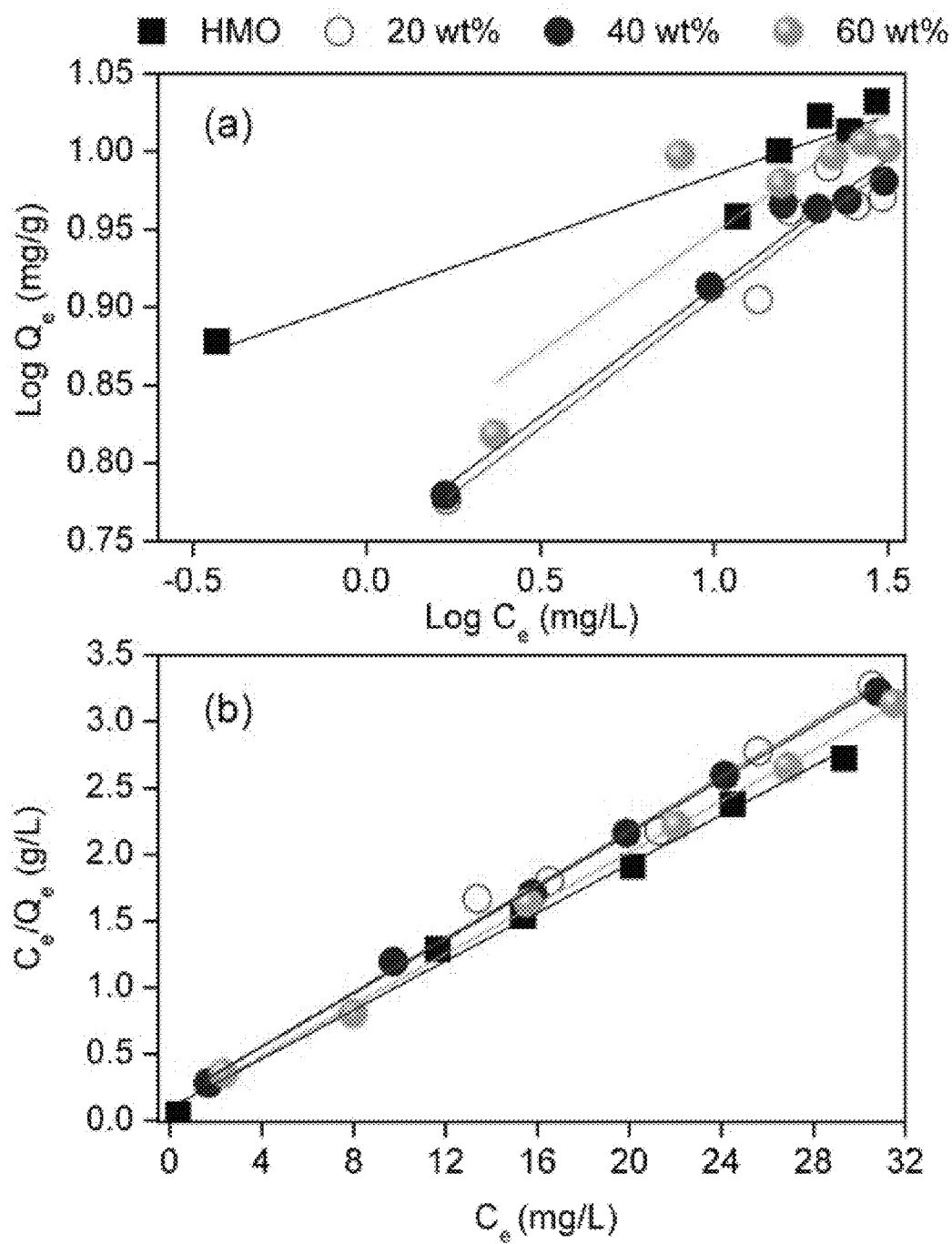
FIG. 18 shows adsorption isotherms of the HMO powder and the HMO/PAN composite nanofiber membrane (at 298 K): (a) Freundlich, and (b) Langmuir.

FIG. 17 is a graph in which the comparable Li+ adsorption rates of HMO powder and HMO/PAN are plotted against time. Albeit the lower $Q_e'$ of HMO in PAN as discussed earlier in this section, the Li+ uptake rate in HMO/PAN nanofiber membrane was similar with that of the HMO powder; both attained equilibrium condition after 24 hrs.

Effect of HMO Loading on Li+ Adsorption Performance of HMO/PAN Nanofiber Membrane The effect of HMO loading on the adsorption performance of the HMO/PAN was elucidated by first modeling the equilibrium Li+ uptake results according to Freundlich and Langmuir as defined by Equations 4 and 5.

$$\ln Q_e' = \ln K_f + \frac{1}{n} \ln C_e \quad (4)$$

$$\frac{C_e}{Q_e'} = \frac{K_L}{q_m} \times C_e + \frac{1}{q_m \times K_L} \quad (5)$$

Wherein $K_f$ and n are Freundlich constants, $K_L$ is the Langmuir adsorption equilibrium constant, $q_m$ is the maximum theoretical Li+ adsorption capacity. A summary of calculated values from Equations 5 and 6 are listed in Table 5.

TABLE 5

Adsorption Isotherm Constant

| | Freundlich | | | Langmuir | | |
|---|---|---|---|---|---|---|
| Adsorbents | n | $K_f$ (mg/g) | $r^2$ | $K_L$ (L/mg) | $q_m$ (mg/g) | $r^2$ |
| HMO | 12.82 | 8.06 | 0.90 | 0.99 | 10.7 | 0.99 |
| 20 wt % HMO/PAN | 5.98 | 5.48 | 0.92 | 0.85 | 8.3 | 0.99 |
| 40 wt % HMO/PAN | 6.06 | 5.59 | 0.97 | 0.95 | 9.5 | 0.99 |
| 60 wt % HMO/PAN | 6.56 | 6.25 | 0.83 | 0.98 | 10.3 | 0.99 |

Based on the correlation coefficients ($r^2$), Li+ uptake of the HMO powder and the HMO/PAN nanofiber membrane were better fitted to Langmuir isotherm than Freundlich. As anticipated, highest qm value was obtained from HMO powder. All HMO/PAN composite nanofiber membranes had lower $q_m$ values but increased with HMO loading. As revealed in the SEM images of HMO/PAN composite nanofiber membranes (FIG. 13), more adsorbent particles were apparent on the surface of the fibers with increased HMO loading. Increased HMO loading resulted in larger HMO particle sizes (i.e. aggregation) (which are comparable or even larger than the nanofiber diameter). This consequently increased the portion of HMOs exposed on the fiber surface, which minimized the loss of accessible adsorption sites due to PAN blockage by polymer (polyacrylonitrile) binder and thus improved the $q_m$ values. At 60 wt % HMO loading, the attained $q_m$ value of HMO/PAN was only lower by approximately 4% than that of HMO powder. On the other hand, 22% and 11% reductions were obtained from HMO/PAN with 20- and 40 wt % loadings, respectively. Thus from the obtained isotherm results, higher HMO loading was favorable in minimizing the adsorption capacity reduction induced by the presence of PAN.

Regenerability of HMO/PAN Composite Nanofiber Membrane

Figure 19:
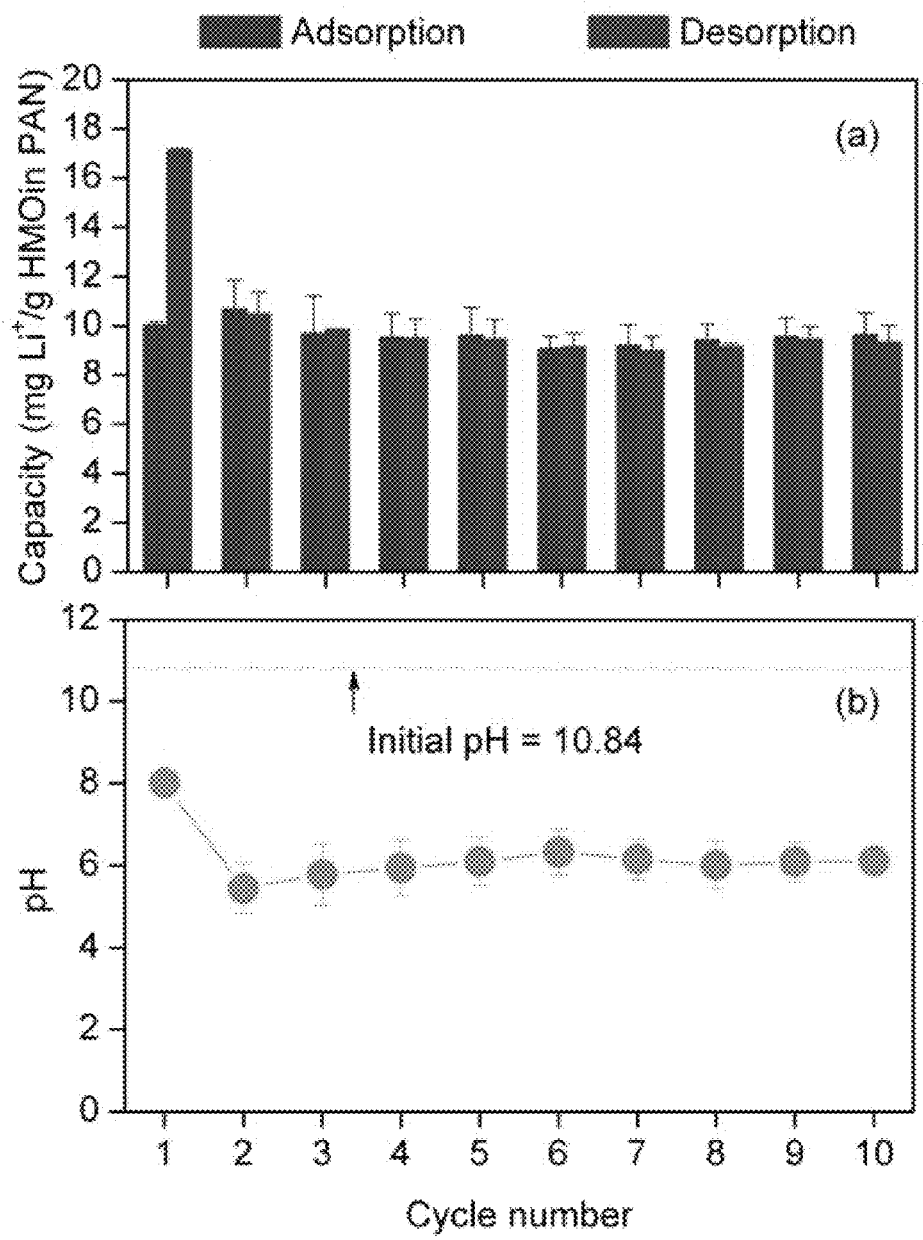
FIG. 19 shows the recyclability of the HMO/PAN composite nanofiber membrane (60 wt % HMO loading). (a) lithium ion adsorption/desorption and (b) solution pH.

The recyclability of the 60 wt % HMO/PAN composite nanofiber membrane was investigated as shown in FIG. 19a. Equilibrium adsorption uptake of 10 mg Li+/g was achieved at the first cycle whereas Li+ desorption at cycle 1 reached up to 17 mg/g. The higher amount of desorbed Li+ than the adsorbed value can be attributed to the co-extraction of the Li+ that were originally retained in HMO during its preparation. With only 88.7% of Li+ removed from LMO to produce HMO, the remaining 11.3% was equivalent to 7.53 mg Li+/g. This indicates that the actual Li+ content of HMO in PAN after adsorption at cycle 1 is approximately 17.53 Li+ mg/g. With a very close desorption value at cycle 1, the results indicate that majority of the retained Li+ was co-eluted along with those adsorbed by the HMO in PAN.

With relatively more available ion-exchangeable sites, slightly higher Li+ uptake was observed at the second adsorption cycle. The Li+ uptake slightly declined as the number of recycle was increased. The measured equilibrium pH values in FIG. 19b agreed with the observed Li+ uptake trend. It is known that the HMO structure could deteriorate with repeated cycles as manganese could co-elute with Li+ during acid treatment. Based on the result, however, only slight Li+ uptake reduction (3.8%) was observed after the tenth adsorption run, suggesting the high chemical stability of the HMO/PAN nanofiber. Previous study revealed that support-free HMO experienced 20% Li+ uptake reduction after ten cycles. The lower loss in Li+ uptake by HMO/PAN during recycling indicates that PAN might have additionally served as a protective matrix for the HMO, which reduced its vulnerability to acid attack during regeneration.

Figure 20:
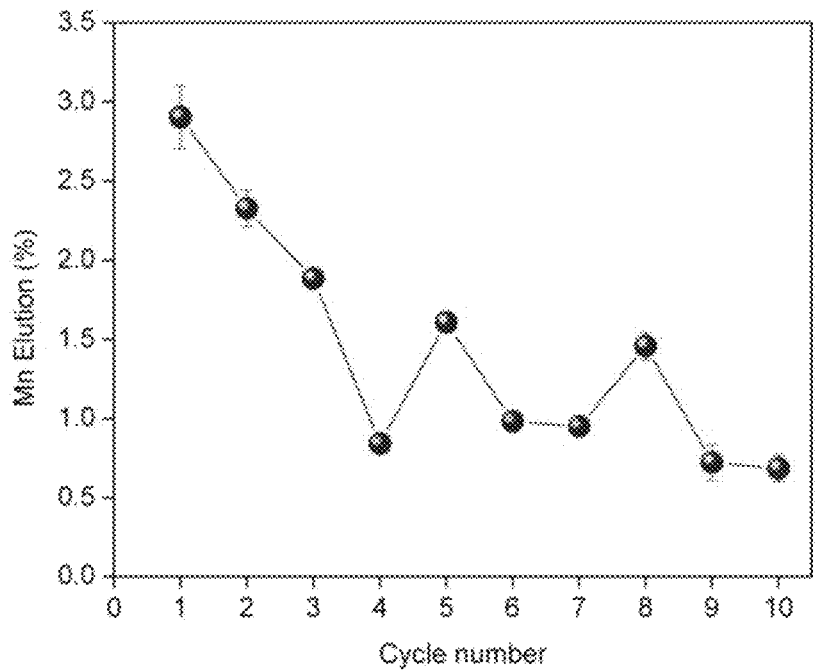
FIG. 20 is a graph in which the amount (%) of manganese eluted from the HMO/PAN composite nanofiber membrane (60 wt % HMO loading) is plotted against cycle number during recycling experiments.

The chemical stability of HMO/PAN was evaluated through the measured % Mn elution values during the recycling experiment. The results are depicted in FIG. 20. With significant Li+ elution during the first desorption run, high Mn elution (2.9%) was also measured. However, after the loosely bound components on the surface of HMO in PAN were eroded, % Mn elution gradually declined until it attained relatively steady values from cycle 4. From the results, % Mn elution ranged between 0.68% and 1.58%. An earlier study on HMO stability revealed that its adsorption performance starts to deteriorate when 70% of Mn is eluted. Using this value as a basis for acceptable adsorption performance of the material as well as the % Mn elution range of values (0.68-1.58%), the number of cycles for nanofiber adsorbent use can be crudely estimated. Roughly, 60 wt % HMO/PAN composite nanofiber membrane could be potentially used with satisfactory performance 44-103 times. Furthermore, HMO/PAN is much easier to handle compared to HMO powder, which is more difficult to recover during recycling.

Figure 21:
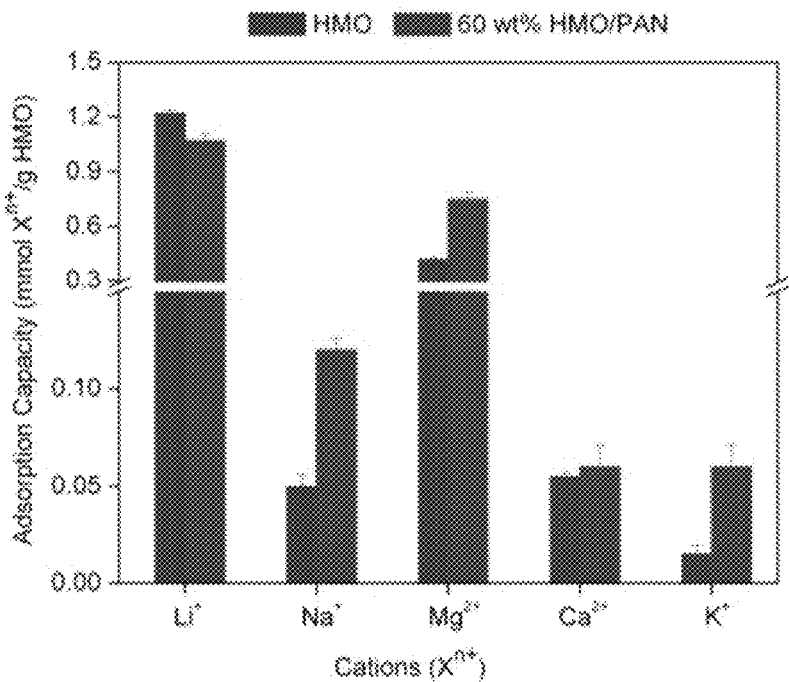
FIG. 21 is a graph showing the adsorption capacity for lithium ions and other cations of the HMO powder and the HMO/PAN composite nanofiber membrane (60 wt % HMO loading).

Li+ Separation Performance of HMO Powder and HMO/PAN Nanofiber Membrane in Seawater Desalination Retentate FIG. 21 is a graph showing the Li+ uptake of the HMO/PAN nanofiber membrane from seawater desalination retentate, wherein the concentrations of competitive cations were several orders higher than Li+. The separation efficiency of the composite nanofiber membrane was evaluated in terms of distribution coefficient ($K_D$), separation factor ($\alpha$) and concentration factor (CF) as expressed in Equations (6)-(8), respectively. Characterization of the seawater desalination retentate is summarized in Table 6.

TABLE 6

Properties of Seawater Desalination Retentate: metal analysis

| Cations | Concentration (mg/L) |
|---|---|
| Li+ | $0.60 \times 10^1$ |
| Na+ | $1.97 \times 10^4$ |

TABLE 6-continued

Properties of Seawater Desalination Retentate: metal analysis

| Cations | Concentration (mg/L) |
|---|---|
| $Mg^{2+}$ | $1.52 \times 10^3$ |
| $Ca^{2+}$ | $3.58 \times 10^2$ |
| $K^+$ | $5.34 \times 10^2$ |
| Tot-Fe | $0.20 \times 10^1$ |
| $Zn^{2+}$ | $0.20 \times 10^{-2}$ |
| $Sr^{2+}$ | $0.48 \times 10^{-1}$ |

$$K_D = \frac{(C_o - C_e) \times V}{C_e \times m} \qquad (6)$$

$$\alpha = \frac{K_{D(Li)}}{K_{D(Me)}} \text{ where } Me = Li^+, Na^+, K^+, Ca^{2+} \text{ and } Mg^{2+} \qquad (7)$$

$$CF = \frac{Q_{e(Me)}}{C_{o(Me)}} \qquad (8)$$

As summarized in Tables 7 and 8, $Li^+$ exhibited the highest $Q_e$ among the cations present in seawater despite having the lowest $C_o$. The $Q_e$ trends obtained from HMO powder was $Li^+ \gg Mg^{2+} > Ca^{2+} > Na^+ > K^+$ whereas that of 60 wt % HMO/PAN nanofiber membrane followed the sequence $Li^+ \gg Mg^{2+} > Na^+ > Ca^{2+} > K^+$. The difference in trend could be due to the physio-sorption of other cations on PAN binder. Nonetheless, the overall trends for HMO powder and 60 wt % HMO/PAN suggest that both materials were most selective towards $Li^+$.

TABLE 7

Li⁺ separation performance of HMO powder from other cations in seawater desalination retentate

| Cations | $C_o$ (mg/L) | $C_o$ (mmol/L) | $C_e$ (mmol/L) | $Q_e$ (mmol/g) | $K_d$ (mL/g) | α Li Me | CF × 10⁻³ (L/g) |
|---|---|---|---|---|---|---|---|
| $Li^+$ | 15.34 | 2.21 | 1.19 ± 0.02 | 1.22 ± 0.019 | 1021.74 | 1 | 550.51 |
| $Na^+$ | 18,515 | 805.70 | 805.66 ± 1.05 | 0.05 ± 0.006 | 0.07 | 15196 | 0.07 |
| $Mg^{2+}$ | 2,359 | 97.08 | 96.63 ± 3.00 | 0.42 ± 0.009 | 4.38 | 233 | 4.4 |
| $Ca^{2+}$ | 433 | 10.80 | 10.75 ± 0.34 | 0.05 ± 0.002 | 4.55 | 224 | 4.5 |
| $K^+$ | 702 | 17.95 | 17.93 ± 0.82 | 0.02 ± 0.005 | 1.33 | 766 | 1.3 |

TABLE 8

Li⁺ separation performance of 60 wt % HMO/PAN nanofibers from other cations in seawater desalination retentate.

| Cations | $C_o$ (mg/L) | $C_o$ (mmol/L) | $C_e$ (mmol/L) | $Q_e$ (mmol/g) | $K_d$ (mL/g) | α Li Me | CF × 10⁻³ (L/g) |
|---|---|---|---|---|---|---|---|
| $Li^+$ | 15.34 | 2.21 | 1.39 ± 0.02 | 1.07 ± 0.040 | 770.13 | 1 | 484.0 |
| $Na^+$ | 18,515 | 805.70 | 805.61 ± 1.01 | 0.12 ± 0.006 | 0.14 | 5312 | 0.1 |
| $Mg^{2+}$ | 2,359 | 97.08 | 96.52 ± 1.04 | 0.75 ± 0.041 | 7.76 | 99 | 7.7 |
| $Ca^{2+}$ | 433 | 10.80 | 10.76 ± 0.09 | 0.06 ± 0.011 | 5.48 | 141 | 5.5 |
| $K^+$ | 702 | 17.95 | 17.91 ± 0.15 | 0.06 ± 0.011 | 3.29 | 234 | 3.3 |

As pointed out in many studies, $Li^+$ was found to best fit the $H^+$-ion exchangeable sites within the HMO structure, thereby preventing the re-insertion of other cations. As most of these cations are remarkably more concentrated than that of $Li^+$, they are more likely to adhere on the HMO surface and thus to interfere with the passage of dilute $Li^+$ within the HMO cavities to some extent. As is apparent from data of Tables 7 and 8, however, the observed $K_D$ trends demonstrate the remarkable ion-sieving effect of the HMO. The $K_D$ values of $Li^+$ for both HMO powder and HMO/PAN nanofiber membrane were much higher than those of the other cations, which indicate that the ion-sieving $Li^+$ adsorption effect predominates over the nonselective surface adsorption of other cations in HMO. Likewise, the obtained α values from both materials indicate the high separation efficiency of $Li^+$ from other cations. The CF values of HMO/PAN reveal that $Li^+$ can be concentrated up to approximately 500 times while the rest of the cations are already concentrated and can be enriched at significantly lower degrees.

The HMO/PAN composite nanofiber membrane exhibited slightly lower $Li^+$ uptakes and slightly higher $Q_e$ values for other cations. Nonetheless, the marginal increase in $Na^+$, $Ca^{2+}$, $Mg^{2+}$ and $K^+$ adsorptions are considered to be not detrimental to the separation performance of HMO/PAN as $K_D$ and CF values of $Na^+$, $Ca^{2+}$, $Mg^{2+}$ and $K^+$ remained low. Thus, the HMO/PAN composite nanofiber membrane was proved to be a potential recyclable material for $Li^+$ recovery from seawater.

Figure 22:
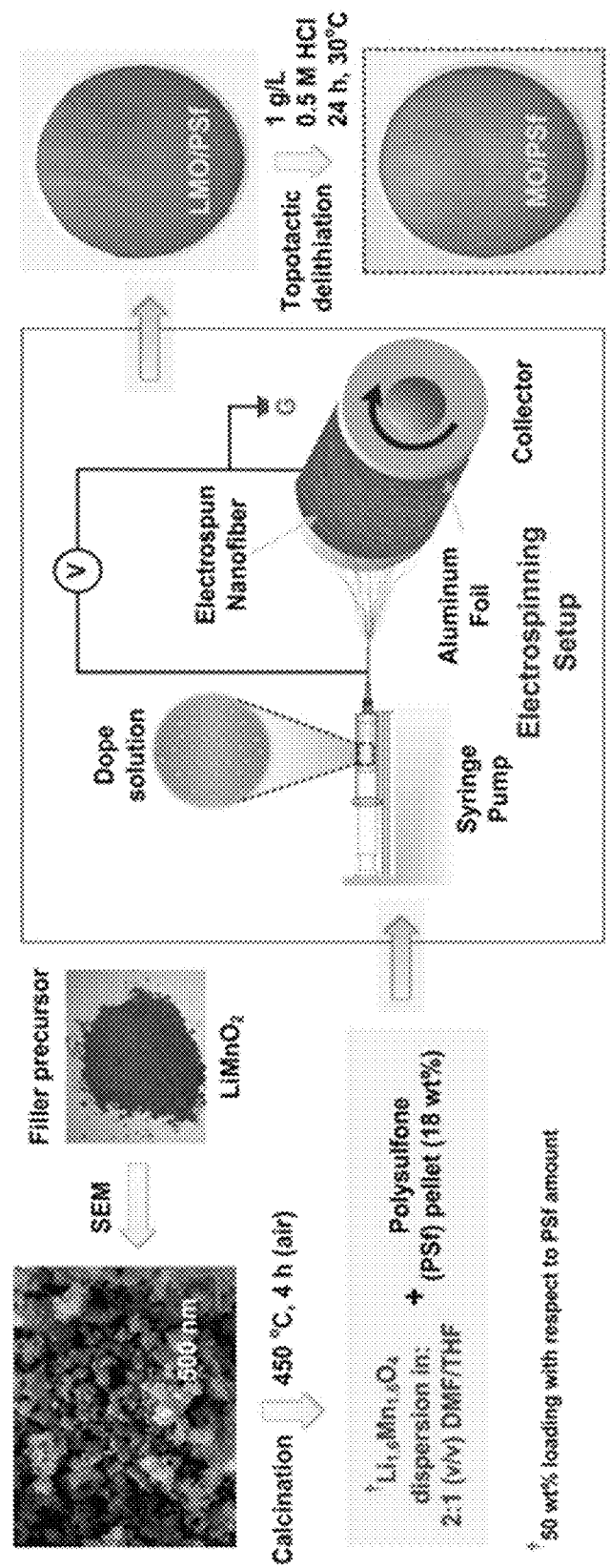
FIG. 22 is a schematic view illustrating the preparation of an HMO/PSf ($H_{1.6}Mn_{1.6}O_4$/polysulfone, MO/PSf) composite nanofiber membrane by electrospinning.

Example 5: Preparation of HMO/PSf ($H_{1.6}Mn_{1.6}O_4$/Polysulfone, MO/PSf) Composite Nanofiber Membrane The LMO/PSf nanofiber membrane prepared in Example 1-1 was delithiated via acid treatment with 0.5 M HCl (see FIG. 22). For $Li^+$ leaching via $Li^+/H^+$ ion exchange, 2 L of 0.5 M HCl solution was used per 1.5 g of the sieved LMO. After 24 hrs of leaching, LMO was converted into $H_{1.6}Mn_{1.6}O_4$(HMO) to prepare an HMO/PSf (MO/PSf) nanofiber membrane. The HMO/PSf nanofiber membrane was washed with deionized water (DI), and oven-dried at 30° C.

Comparative Example 2: Preparation of Polysulfone Nanofiber Membrane

A dope solution was prepared in the same manner as described above, but for not using the $Li_{1.6}Mn_{1.6}O_4$ (LMO) adsorbent powder. From the dope solution, a pure polysulfone nanofiber membrane was prepared as described above.

Test Example 7: Analysis for Physical Properties of HMO/PSf(MO/PSf) Nanofiber Membrane Physical properties of the HMO/PSf composite nanofiber membrane prepared in Example 5 were analyzed as follows.

XRD Analysis

Using an X-ray diffractometer (PANalytical X'pert-Pro, The Netherlands), LMO and delithiated LMO were analyzed for structural property. The patterns of them could be indexed to face-centered cubic systems with α=8.14 Å, and α=8.03 Å, respectively.

Effect of Thermal Treatment on Mechanical Properties

Figure 23:
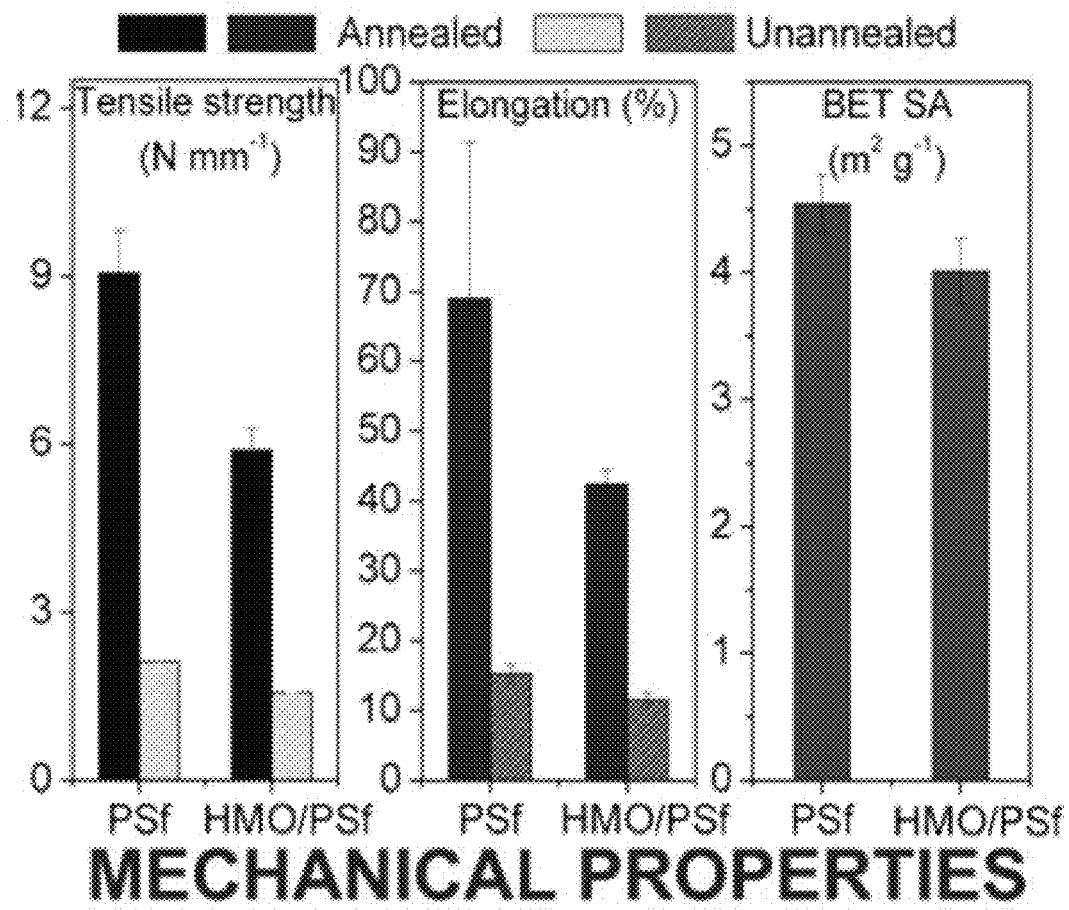
FIG. 23 shows mechanical properties of the HMO/PSf composite nanofiber membrane and the PSf nanofiber membrane before and after thermal treatment.

Samples annealed at 190° C., and unannealed samples were analyzed for mechanical properties and the results are given in FIG. 23. The annealed samples were observed to greatly increase in tensile strength and elongation, as measured by UTM (Universal Testing Machine).

In enhancing mechanical properties of the composite nanofiber membrane by thermal treatment, the temperature and time of the thermal treatment serve as very important factors. When the thermal treatment is carried out at too a high temperature or for too long a period of time, the nanofiber undergoes shrinkage. Particularly, the polymer shrinkage may block the lithium adsorption site of $Li_{1.6}Mn_{1.6}O_4$ within the nanofibers, resulting in a decrease in lithium uptake. Hence, it is very important to seek suitable thermal treatment conditions.

The thermal treatment for enhancing mechanical properties of the composite nanofiber membrane using polysulfone is preferably carried out at a temperature of 185~195° C., a temperature range from the glass transition temperature to melting point of polysulfone. For other polymeric materials used in composite nanofiber membranes, the temperature of the heat treatment may preferably range from their glass transition temperatures to melting points.

The composite nanofiber membrane of Example 5 was found to have a slightly lower BET (Brunauer-Emmett-Teller) specific surface area than does the PSf nanofiber membrane (Comparative Example 2) (see FIG. 23), as measured by ASAP 2020 (Micromeritics Instrument Corporation, USA) ($N_2$ atmosphere, −196° C.).

Surface Morphology Analysis

Figure 24:
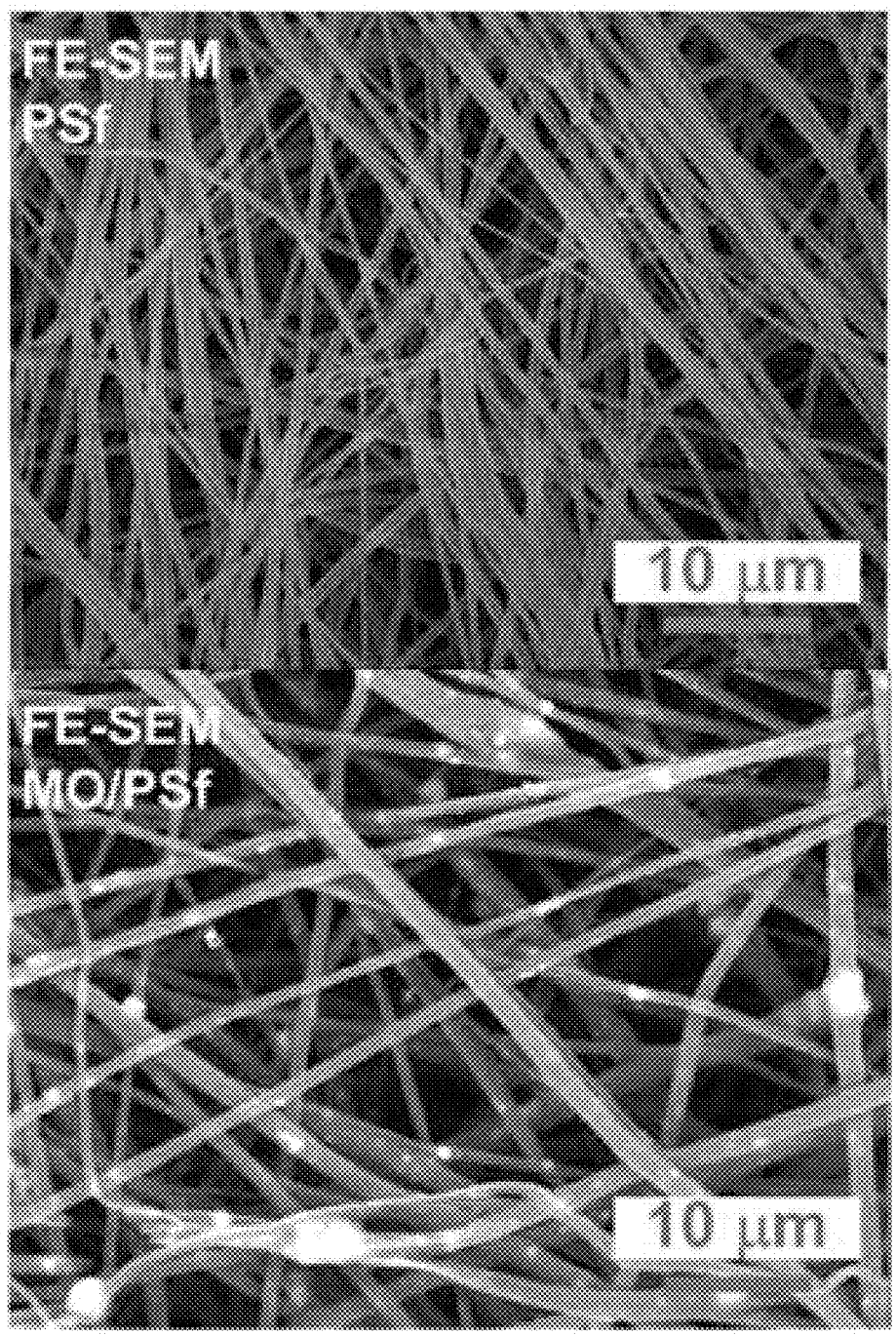
FIG. 24 shows SEM images of the HMO/PSf (MO/PSf) composite nanofiber membrane and the PSf nanofiber membrane.

FIG. 24 shows surface morphologies of the pure polymer (PSf) nanofiber membrane (upper panel) and the HMO/PSf (MO/PSf) composite nanofiber membrane (lower panel) prepared as described above as observed under Scanning Electron Microscope equipped with Energy Dispersive X-ray Spectrometer (SEM-EDX, Hitachi S-3500 N, Japan). The pure polymer (PSf) nanofiber membrane had a smooth surface whereas protrusions of HMO (MO) particles were observed on the surface of the HMO/PSf(MO/PSf) composite nanofiber membrane.

Figure 25:
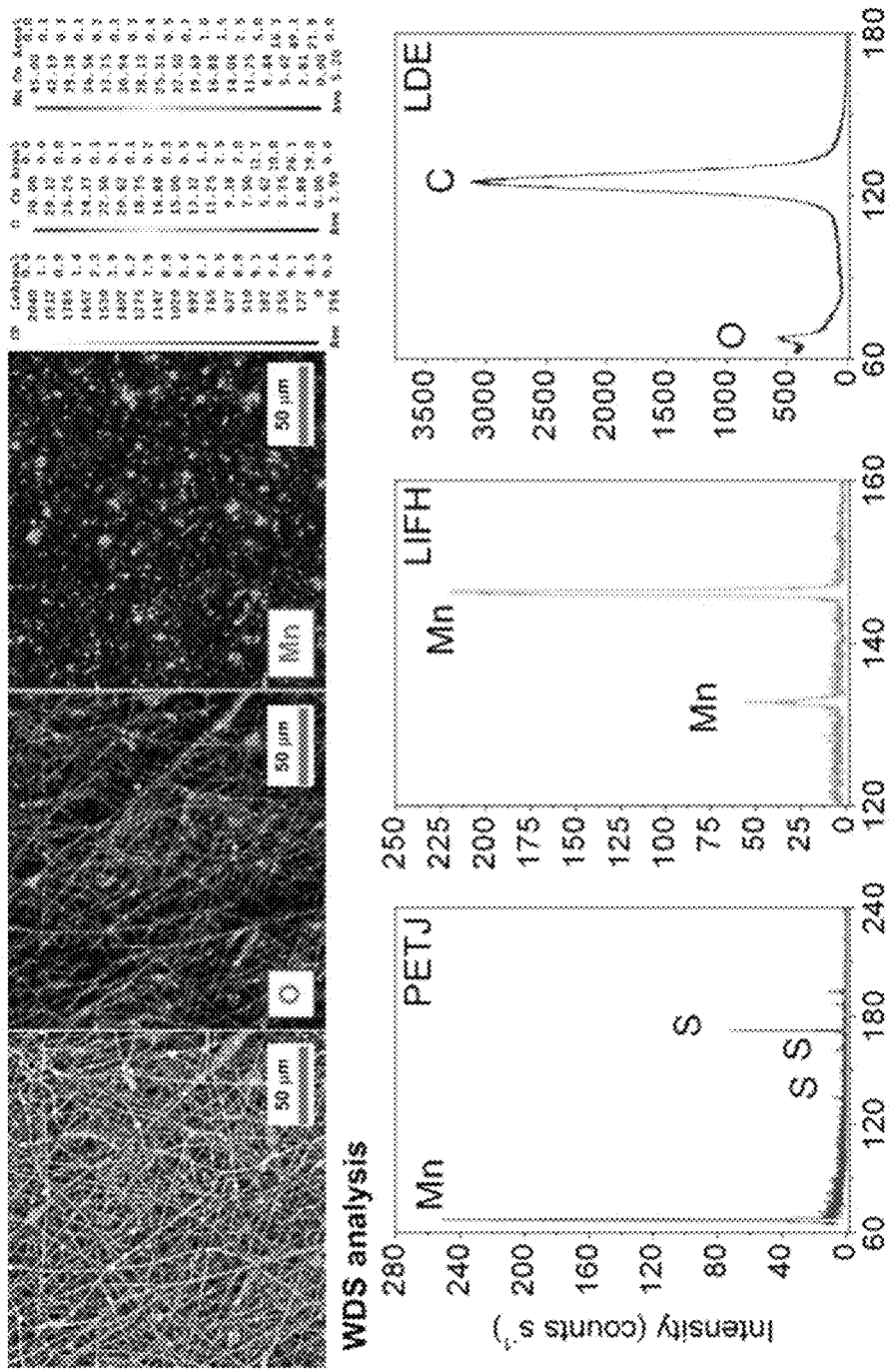
FIG. 25 shows EPMA element mapping and WDS analysis results of the HMO/PSf (MO/PSf) composite nanofiber membrane.

For more accurate analysis, the surface of the HMO/PSf (MO/PSf) composite nanofiber membrane was mapped using Field Emission-Electron Probe Micro-analyzer (FE-EPMA JEOL JXA-8500F Hyperprobe, Germany) with the aid of WDS (Wavelength Dispersive Spectrometer) equipped with EDS (Energy Dispersive X-ray Spectrometer) and three-channel analyzing crystals (LDE2, LIFH, and PETJ within l=0.087-9.3 nm). The resulting distribution data of manganese (Mn) and oxygen (O) elements are depicted in FIG. 25. Aggregated HMO (MO) particles had a diameter ($D_{ag}$) of 3.06 μm, and WDS analysis revealed the composition of C (68.2%), S (5.1%), O (15.8%), and Mn (10.9%). The HMO (MO) particles protruded from the surface may be advantageous in terms of adsorption efficiency because they can minimize the shielding of surface adsorption sites by PSf.

Figure 26:
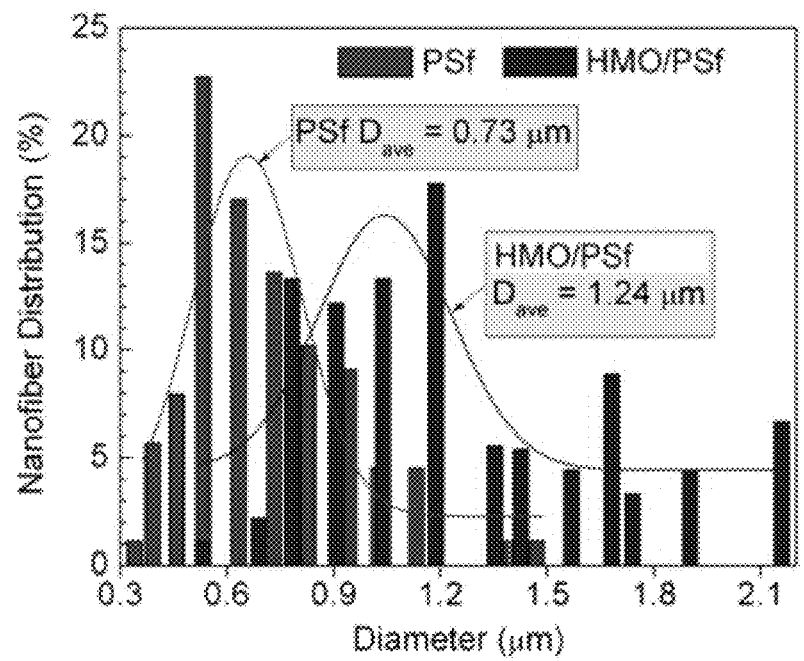
FIG. 26 is a graph of nanofiber diameters of the HMO/PSf composite nanofiber membrane and the PSf nanofiber membrane.

FIG. 26 is a graph of nanofiber diameters according to FE-SEM image analysis. The pure PSf nanofiber membrane was found to have a mean diameter of 730 nm while the HMO/PSf composite nanofiber membrane was 1240 nm in mean diameter. This large diameter was attributed to the high viscosity of the dope solution used for the preparation of the composite nanofiber membrane. Fibers with large diameters can be produced during electrospinning with a very viscous dope solution.

Figure 27:
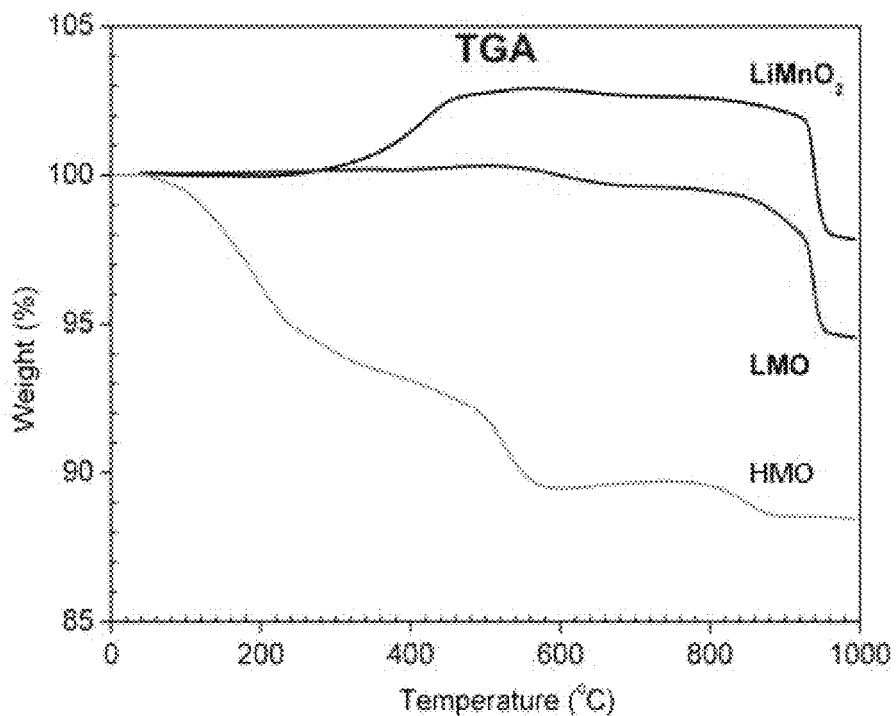
FIG. 27 is a thermogravimetric analysis graph of LMO, $LiMnO_2$, and HMO (MO) powders.
Figure 28:
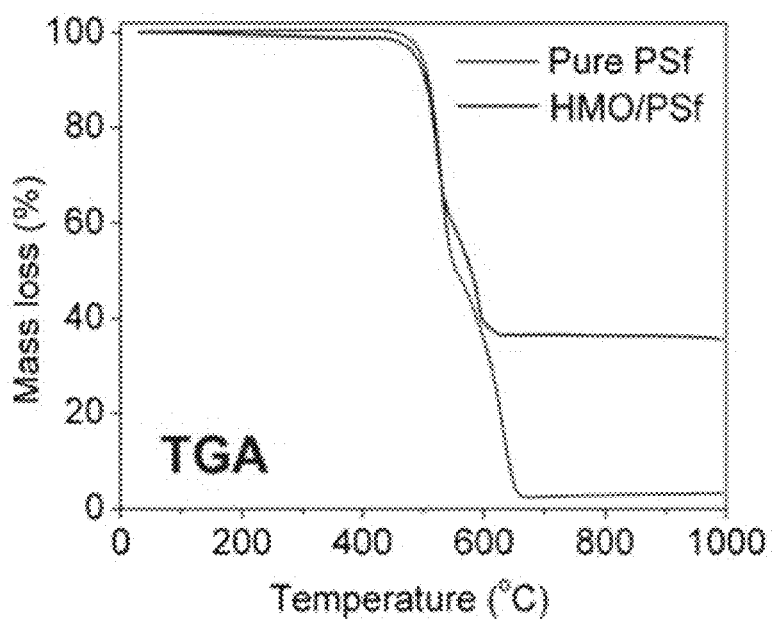
FIG. 28 is a thermogravimetric analysis graph for the HMO/PSf (MO/PSf) composite nanofiber membrane and the pure PSf nanofiber membrane.

FIG. 27 is a thermogravimetric analysis graph of LMO, $LiMnO_2$, and HMO (MO) particles, and FIG. 28 is a thermogravimetric analysis graph for the pure PSf nanofiber membrane and the HMO/PSf (MO/PSf) composite nanofiber membrane. At about 660° C., the pure PSf nanofiber membrane was completely degraded whereas 38.54% of the mass of the HMO/PSf(MO/PSf) composite nanofiber membrane still remained due to the HMO (MO) particles included therein.

Test Example 8: Analysis for $Li^+$ Uptake Performance of HMO/PSf Composite Nanofiber Membrane The HMO/PSf composite nanofiber membrane prepared in Example 5 was performed for $Li^+$ adsorption performance as follows: Samples were added to a simulated $Li^+$ solution in an agitation incubator (200 rpm) at 25° C. (298 K). After 24 hrs, pH measurement and metal analysis were made using ICP-MS (ICP-MS Agilent 7500 series, USA). Equilibrium $Li^+$ adsorption capacity ($Q_e$) was quantified using Equation (1).

Effect of pH

Figure 29:
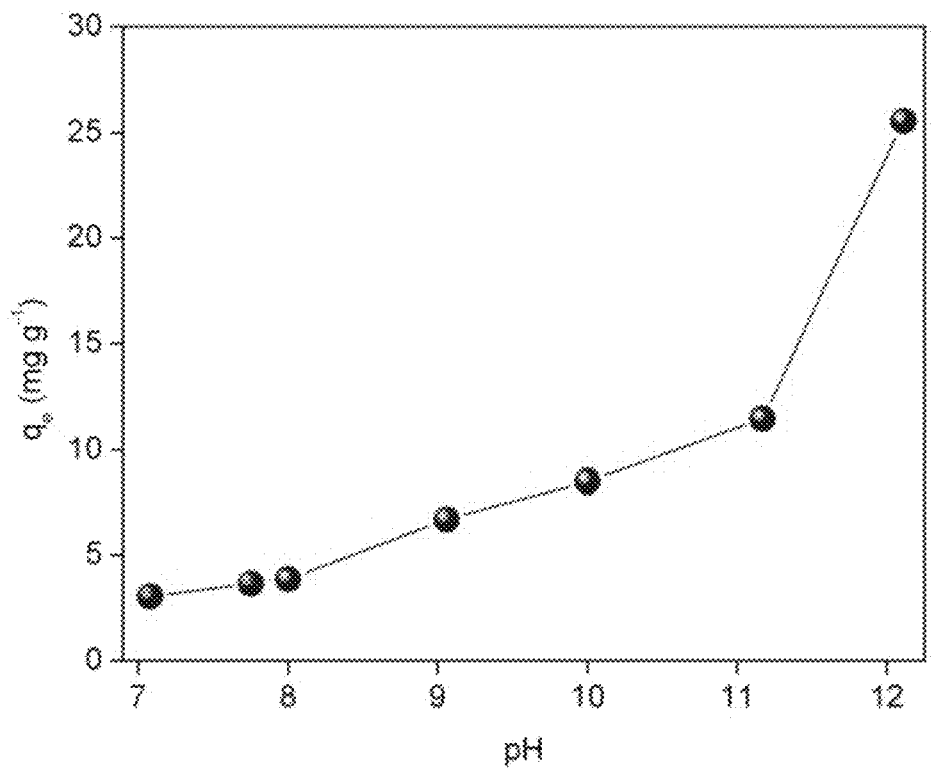
FIG. 29 is a graph showing relationship between lithium adsorption capacity and pH in the HMO powder (V=340 mL; m is approximately 50 mg; [Li$^+$]=1 mM (7 mgL$^{-1}$)).

Lithium adsorption and desorption of the HMO (MO) adsorbent powder can be accounted for the following ion exchange reaction: HMO (s)+$Li^+$ (aq)↔ LiMO (s)+$H^+$ (aq). Using unbuffered $Li^+$ solutions (pH 7~12) and an ammoniacal ($NH_3$/$NH_4Cl$) buffered $Li^+$ solution (pH=9.75), the adsorption performance of the HMO adsorbent powder was analyzed. FIG. 29 is a graph of adsorption performance analysis results using the unbuffered $Li^+$ solution. At pH≥8, $Q_e$<5 mgg$^{-1}$ was obtained. A maximum $Q_e$ was 27 mg g$^{-1}$ at a pH of 12. This condition is, however, highly unlikely to exist in actual feed streams. For the unbuffered system, hence, $Li^+$ solution pH 11 ($Q_e$=11.44 mgg$^{-1}$) was employed.

Figure 30:
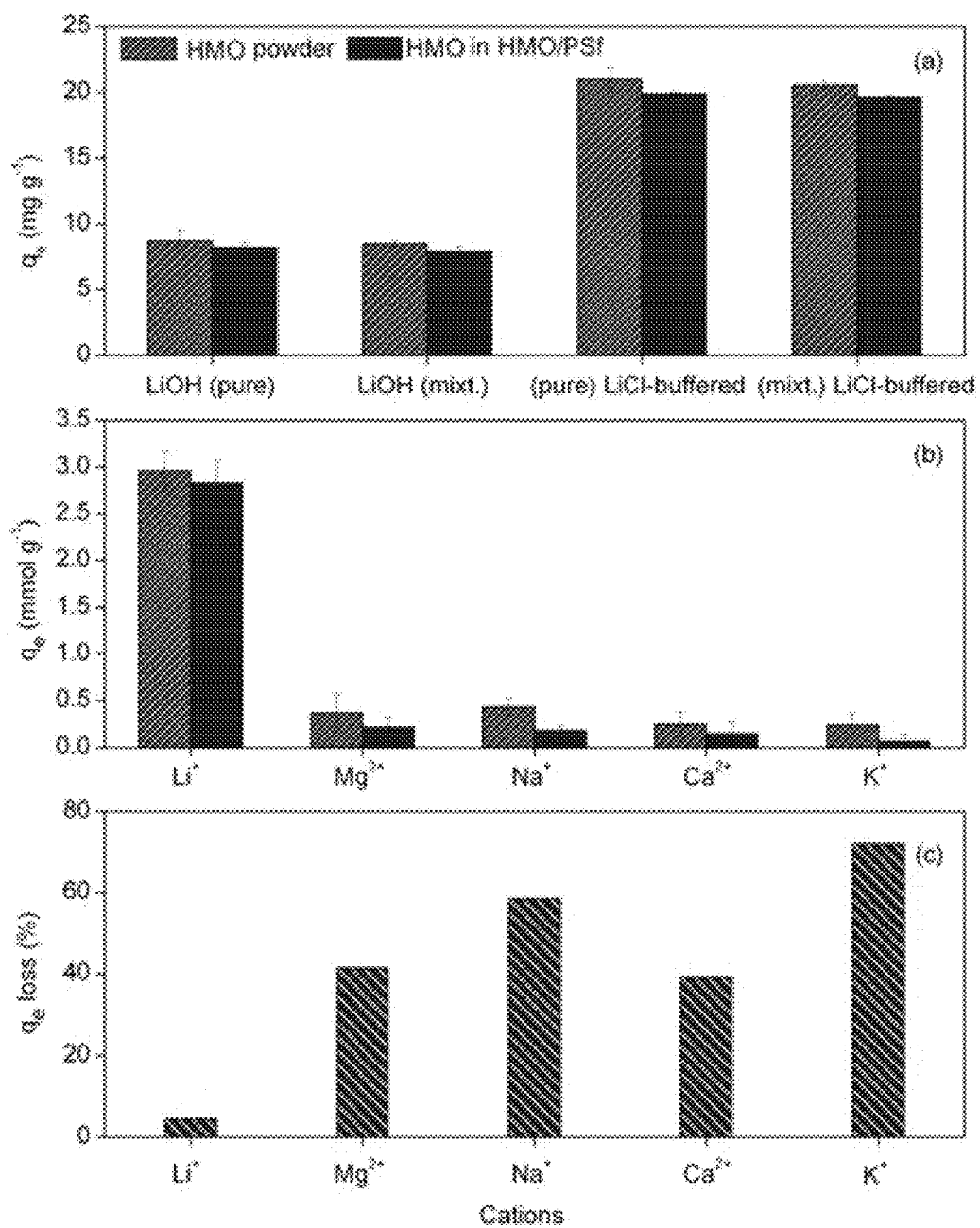
FIG. 30 shows the comparison of lithium ion adsorption capacity between the HMO powder and the HMO/PSf composite nanofiber membrane. (a) a pure lithium ion solution (pure; unbuffered solutions; pH=10), a mixed solution of lithium ions and other cations (mixt.; unbuffered solutions; pH=10) (M$^{n+}$=Na$^+$, K$^+$, Mg$^{2+}$, Ca$^{2+}$), a pure lithium ion solution (pure; ammoniacal buffered solutions; pH=9.75; V=340 mL; m is approximately 50 mg; [Li$^+$]=1 mM (7 mgL$^{-1}$); [Mn$^+$]=10 mM), a mixed solution of lithium ions and other cations (mixt.; ammoniacal buffered solutions; pH=9.75; V=340 mL; m is approximately 50 mg; [Li$^+$]=1 mM (7 mgL$^{-1}$); [M$^{n+}$]=10 mM) (M$^{n+}$=Na$^+$, K$^+$, Mg$^{2+}$, Ca$^{2+}$). (b) uptake of competing ions (ammoniacal buffered pH=9.75; V=340 mL; m is approximately 50 mg; [Li$^+$]=1 mM (7 mgL$^{-1}$). (c) loss of ion adsorption capacity (% Q$_e$ losses) of HMO/PSf composite nanofiber membrane.

In batch experiments using small amounts (volumes) of samples, with the uptake of Li ions, hydrogen ions are released and accumulated to decrease the pH of the solution, which results to interfering with the uptake of Li ions. This tendency is described in FIG. 30a. The $Q_e$ (=22 mgg$^{-1}$) of a pH-buffered LiCl solution (pH=9.75) is remarkably higher than ($Q_e$=8.5 mgg$^{-1}$) of the unbuffered LiCl (pH=10). In FIG. 30a, "pure" represents a solution containing lithium ions alone, and "mixt." represents a solution containing lithium ions in mixture of other cations ($M^{n+}$=$Na^+$, $K^+$, $Mg^{2+}$, $Ca^{2+}$). However, when the HMO/PSf composite nanofiber membrane is under continuous operation, this behavior may not be observed because a significantly higher feed volume renders the pH drop negligible. Accordingly, the application of the HMO/PSf(MO/PSf) composite nanofiber membrane to a continuous flowthrough system may unnecessitate the buffering of the feed stream.

Analysis for Effect of PSf-Supported Matrix in HMO/PSf Composite Nanofiber Membrane To evaluate the effect of polysulfone (PSf) as a support matrix, (1) $Q_e$ value (2) uptake adsorption kinetics, and (3) selectivity (competing metal ions) were compared between the HMO (MO) powder and the HMO/PSf composite nanofiber membrane.

Figure 31:
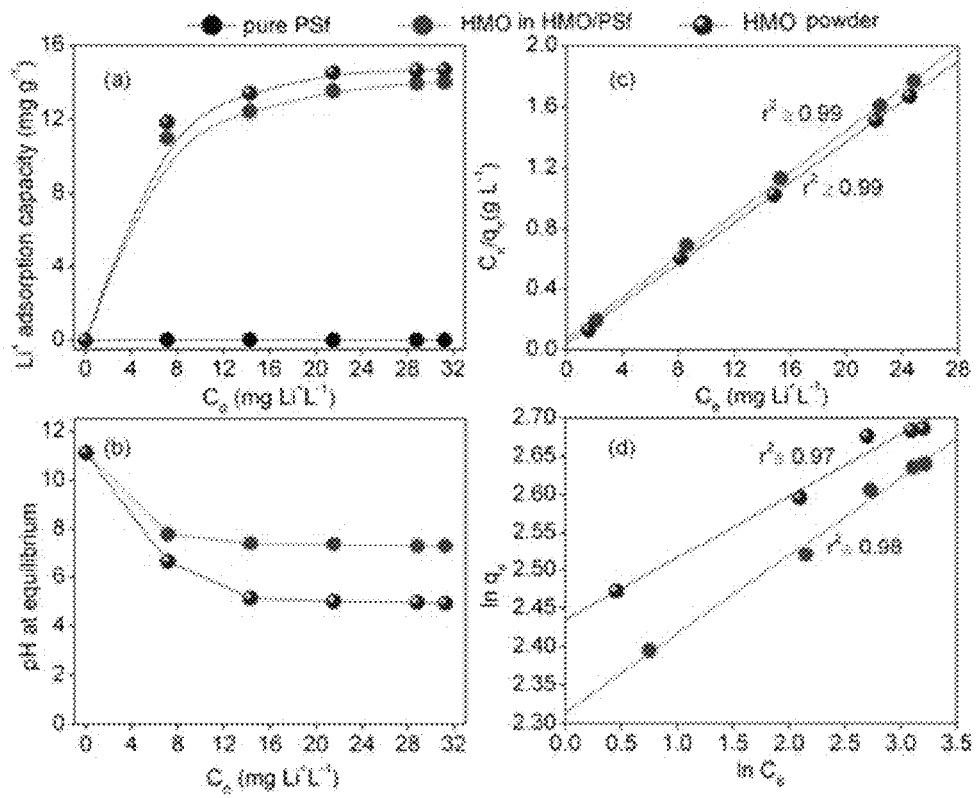
FIG. 31 shows the comparison of lithium uptake between the HMO powder and the HMO/PSf composite nanofiber membrane. (a) under different lithium ion concentrations. (b) at initial pH and at equilibrium pH. (c) equilibrium lithium uptake linear model (Langmuir fit). (d) equilibrium lithium uptake linear model (Freundlich fit) (pH=11.08; V=340 mL; m is approximately 50 mg).

For accurate observation of the effect of polysulfone (PSf) on the adsorption performance of dispersed HMO, comparison was made of lithium ion adsorption capacity $Q_e$ (HMO adsorbent powder) and $Q_e'$ (HMO/PSf composite nanofiber membrane). As can be seen in FIG. 31a, the pure PSf nanofiber membrane was incapable of $Li^+$ uptake, and $Q_e$ increased with an increase in lithium ion level. $Q_e'$ values were lower than $Q_e$ values, which may be attributed to the loss of HMO adsorption sites caused by binding with polysulfone (PSf). The equilibrium adsorption loss is expressed as % $Q_e$ loss in Equation 3, which pertains to the percentage of discrepancy between $Q_e$ and $Q_e'$. In this Test Example, a $Q_e$ loss of 4.5-7.5% was measured from HMO in a PSf nanofiber membrane across the entire $C_o$ range tested. The loss of HMO adsorption sites caused by binding with polysulfone (PSf) can be minimized by the HMO adsorbent powder protruding from the surface of nanofibers. pH at equilibrium was in inverse proportion to $Q_e$ (see FIG. 31b).

FIGS. 31c and 31d are graphs of linearly modeling the equilibrium $Li^+$ uptake results analyzed according to Langmuir and Freundlich as defined by Equations 4 and 5, and the results are summarized in Table 9.

The $q_m$ value of HMO/PSf composite nanofiber membrane was maintained at 96.6% of that of the HMO (MO) adsorbent powder. Both of them exhibited positive $K_L$ values ($K_L$>0), which indicates an advantage for lithium adsorption. As is demonstrated by their $R_L$ (dimensionless separation factors) values (0>$R_L$>1) and free Gibbs energy ($\Delta G^0$<0) that are defined, respectively, by the following Equations 9 and 10, both the HMO/PSf(MO/PSf) composite nanofiber membrane and the HMO(MO) adsorbent powder were found to be advantageous in lithium ion uptake and to spontaneously adsorb lithium ions.

$$R_L = \frac{1}{1 + k_L \times C_0} \quad (9)$$

$$\Delta G^0 = -RT\ln(k_L \times q_m) \quad (10)$$

Analysis of Lithium Ion Uptake Kinetics

Studies on uptake kinetics were performed in a manner similar to that of the equilibrium experiment. However, samples were stirred at 350 rpm before use in order to minimize external mass transport resistance.

Figure 32:
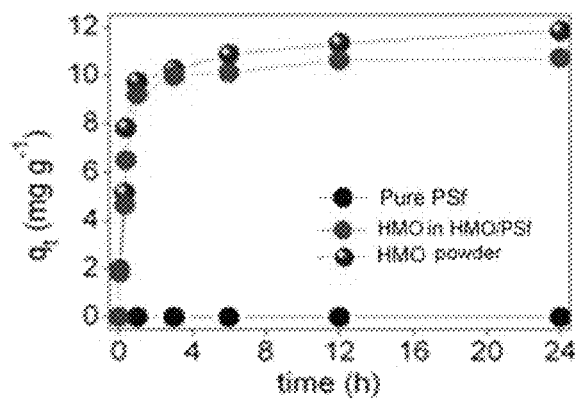
FIG. 32 is a graph showing lithium ion adsorption kinetic analysis results of the HMO powder and the HMO/PSf composite nanofiber membrane.

FIG. 32 is a graph showing adsorption kinetic analysis results of the HMO (MO) powder and the HMO/PSf composite nanofiber membrane. Generally similar results were detected in both the HMO (MO) adsorbent powder and the HMO/PSf (MO/PSf) composite nanofiber membrane whereas no lithium ion adsorption capability was found in the PSf nanofiber membrane.

Selectivity for Lithium Ions by Composite Nanofiber Membrane in the Presence of Other Metal Ions Representative among the cations competing lithium ions for adsorption to the HMO/PSf composite nanofiber membrane are monovalent ions such as potassium (K) and sodium (Na), and bivalent ions such as magnesium (Mg) and calcium (Ca). These cations may competitively inhibit the selective lithium ion uptake of the membrane.

In order to evaluate the selectivity of the HMO/PSf composite nanofiber membrane for lithium ions, a mixture solution of lithium ions and other different cations ($Na^+$, $Mg^{2+}$, $K^+$, $Ca^{2+}$) was used, and the results are summarized in Table 10.

The lithium selectivity of the composite nanofiber membrane was evaluated in terms of distribution coefficient ($K_D$), separation factor ($\alpha$) and concentration factor (CF) as expressed in Equations (6)-(8), respectively.

As is apparent from data of Table 10, in terms of $Q_e$ value obtained from HMO adsorbent powder and HMO/PSf composite nanofiber membrane, $Li^+$ exhibited the highest $Q_e$ amongst the cations present in the HMO absorbent powder and the HMO/PSf composite nanofiber membrane, despite having the lowest $C_o$, which indicates the highest selectivity for $Li^+$.

The $K_D$ values of $Li^+$ for both the HMO powder and the HMO/PSf composite nanofiber membrane were much higher than those of the other cations, which indicate that $Li^+$ adsorption effect predominates over the nonselective surface adsorption of other cations.

The obtained $\alpha$ values from both HMO adsorbent powder and the HMO/PSf composite nanofiber membrane indicate the high separation efficiency of $Li^+$ from other cations. The CF values reveal that $Li^+$ can be concentrated up to approximately 500 times while the rest of the cations are already concentrated and can be enriched at significantly lower degrees.

In addition, when examining the attained $Q_e$ values of the HMO adsorbent powder and the HMO/PSf composite nanofiber membrane, $Q_e$ values for other cations ($Na^+$, $Mg^{2+}$, $K^+$, $Ca^{2+}$) were lower in the HMO/PSf composite nanofiber

TABLE 9

Equilibrium isotherms of MO powder and MO/PSf (pH = 11.08; V = 340 mL; m ≅ 50 mg).

| | Langmuir | | | | | Freundlich | | |
|---|---|---|---|---|---|---|---|---|
| Material | $q_m$ (mg g$^{-1}$) | $k_L$ (L mg$^{-1}$) | $r^2$ | $\Delta G^{o\dagger}$ (kJ mol$^{-1}$) | $R_L{}^\ddagger$ (Unitless) | n | $k_F$ (mg g$^{-1}$) | $r^2$ |
| MO powder | 15.05 | 1.58 | 0.99 | −8.69 | 0.08-0.02 | 12.30 | 11.42 | 0.97 |
| MO/PSf | 14.54 | 0.97 | 0.99 | −7.27 | 0.13-0.03 | 9.74 | 10.12 | 0.98 |

†Universal gas constant R = 8.314 J K$^{-1}$ mol$^{-1}$; Temperature, T = 30° C. (303 K)
‡$C_o$ = 7-31 mg L$^{-1}$ (unbuffered $Li^+$ solution)

membrane than in the HMO adsorbent powder, due to the fact that the PSf matrix reduces the physical adsorption of other cations onto the surface of HMO adsorbent powder (see FIG. 30b). In addition, the lowest $Q_e$ loss (% $Q_e$ loss) of lithium ions was measured in the test using the HMO/PSf nanofiber membrane (FIG. 30c).

As demonstrated by superior α values of the HMO/PSf composite nanofiber membrane, the HMO/PSf composite nanofiber membrane was more effective for lithium ion separation than was the HMO adsorbent powder.

The HMO/PSf nanofiber membrane was greatly decreased in CF values for other cations, compared to the HMO adsorbent powder, which indicates that the HMO/PSf nanofiber membrane more effectively separates lithium ions than does the HMO adsorbent powder. Consequently, the result suggests that the polymer matrix plays an important role in determining the separation efficiency of adsorption membranes.

TABLE 10

(Ammoniacal buffered pH = 9.75; V = 340 mL; m ≈ 50 mg; [Li⁺] = 1 mM (7 mg L⁻¹)).

| Material | Metal ions | $C_o$ (mmol L⁻¹) | $q_e$ (mmol g⁻¹) | $K_d$ (mL g⁻¹) | α (Li⁺/M$^{n+}$) | CF × 10⁻³ (L g⁻¹) |
|---|---|---|---|---|---|---|
| MO | Li⁺ | 5.09 | 2.95 | 1530.05 | 1.00 | 580.19 |
|  | Na⁺ | 19.57 | 0.43 | 22.69 | 67.42 | 22.16 |
|  | Mg²⁺ | 9.99 | 0.37 | 38.63 | 39.61 | 37.10 |
|  | K⁺ | 12.43 | 0.35 | 28.69 | 53.34 | 27.83 |
|  | Ca²⁺ | 5.93 | 0.25 | 43.66 | 35.05 | 41.71 |
| MO/PSf | Li⁺ | 5.09 | 2.82 | 1378.56 | 1.00 | 554.16 |
|  | Na⁺ | 19.86 | 0.05 | 2.75 | 501.34 | 2.74 |
|  | Mg²⁺ | 9.99 | 0.22 | 22.41 | 61.52 | 21.88 |
|  | K⁺ | 12.43 | 0.07 | 5.50 | 250.76 | 5.47 |
|  | Ca²⁺ | 5.93 | 0.15 | 26.14 | 52.74 | 25.42 |

Analysis for Permeability of HMO/PSf Composite Nanofiber Membrane

Figure 33:
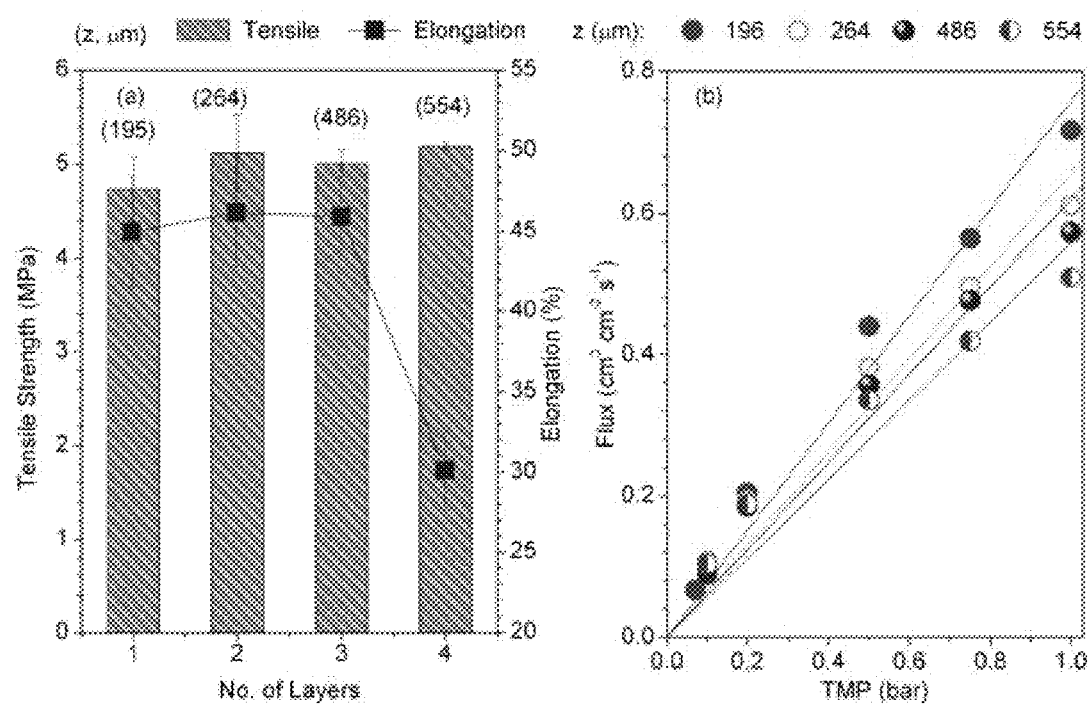
FIG. 33 shows (a) mechanical properties of HMO/PSf composite nanofiber membranes with different thickness and (b) permeability properties (flux vs. TMP) of the membranes as measured in a dead-end filtration experiment.

With the exception that different thermal conditions were employed, the same procedure as in Example 5 was repeated to prepare a composite nanofiber membrane (e.g., two, three or four stacked nanofiber sheets were treated at 190° C. for 90 min while being pressed against Teflon plates at both sides). FIG. 33 shows mechanical properties (tensile strength and elongation) (a) and permeability of the membranes (b) prepared. The mechanical properties were analyzed using a tensile strength tester. For permeability, batch filtration experiments were conducted using the Amicon® unstirred dead-end membrane cell (Model 8050 mL Merck Millipore, Mass., USA). Tests were performed on circular membranes with a diameter of 44.5 mm (effective membrane area A=13.4 cm²) by using clean water from a pressurized 5 L stainless vessel (Millipore, Mass., USA) as a feed solution. Before filtration, the composite nanofiber membrane samples were soaked in ethanol and immersed overnight in deionized water to completely remove the solvent. Measurement was started after the stabilization of TMP (about 20 min later): V (permeate volumes) was measured with time using a topload balance scale (FX-3000i A&D Co., Ltd., Korea). At room temperature (25° C.), experiments were carried out under a trans-membrane pressure (TMP=$P_F$-$P_p$) of 0.05-1.0 bar (5-100 kPa). $R_m$ (Hydraulic membrane resistance) was calculated according to the following Equation 11. In Equation 11, J is flux, $V_p$ is a permeate volume measured at time t, and μ is the viscosity of water at 25° C.

$$J = \frac{1}{A} \times \frac{dV_p}{dt} = \frac{TMP}{\mu \cdot R_m} \quad (11)$$

TABLE 11

Permeability properties of MO/PSf MMN membranes.

| z (μm) | Interstitial pore diameter (2 × $r_v$) (μm) | ϵ (Unitess) | S × 10⁴ (cm² cm⁻³) | P × 10⁻¹ (cm³ cm⁻² s⁻¹ bar⁻¹) | $R_m$ × 10⁸ (cm⁻¹) | r² | $J_{water}$ at 1 bar (cm³ cm⁻² s⁻¹) |
|---|---|---|---|---|---|---|---|
| 195 | 3.9 | 0.71 | 12.7 | 7.58 | 1.55 | 0.99 | 0.72 (25,814)♀ |
| 264 | 2.9 | 0.64 | 11.4 | 6.57 | 1.79 | 0.98 | 0.61 (22,013) |
| 486 | 2.1 | 0.55 | 10.8 | 6.21 | 1.89 | 0.98 | 0.57 (20,665) |
| 554 | 1.8 | 0.49 | 10.4 | 5.58 | 2.10 | 0.98 | 0.51 (18,341) |

♀enclosed (values) are in LMH units.

Physical properties of the composite nanofiber membrane were analyzed according to the following equation and are summarized in Table 11

$$R_m = \frac{K_g \times (1-\varepsilon)^2 S^2 \times z}{\varepsilon^3}$$

(wherein $R_m$ is an intrinsic membrane resistance; $K_g$ is assumed as a constant; z is a membrane thickness; S is a surface area, $\epsilon$ is a porosity of the nanofiber membrane)

As can be understood from data of Table 11, the HMO/PSf composite nanofiber membrane tended to decrease $J_{water}$ with a decrease in interstitial pore size. Particularly, the decrease of $J_{water}$ may be attributed to an increase in intrinsic membrane resistance (Rm).

Found to have an interstitial pore size of 1.8~3.8 μm, the HMO/PSf composite nanofiber membrane can be used as a microfiltration membrane. In addition, the HMO/PSf composite nanofiber membrane exhibited $J_{water}$ at least 12-fold larger than that of well-known MF membranes or UF PSf membranes. Accordingly, the HMO/PSf composite nanofiber membrane according to one embodiment of the present invention can be used for recovering lithium ions through the filtration of large volumes of seawater under a low pressure condition.

Analysis for Lithium Ion Adsorption Efficiency of HMO/PSf Composite Nanofiber Membrane in Lithium Recovery Using Lithium Recovery Apparatus From a 5 L feed tank, seawater (pH=9.65) was supplied via a peristaltic pump to a 50 ml membrane filtration cell (membrane reactor) equipped with an HMO/PSf(MO/PSf) composite nanofiber membrane where the seawater was filtered. Seawater components are listed in Table 12. Metals analysis of seawater components was carried out using ICP-MS.

TABLE 12

| Cations | Concentration (mg/L) | Error (±) |
|---|---|---|
| $Li^+$ | 3.32 | 0.15 |
| $Na^+$ | 16,869 | 473.48 |
| $Mg^{2+}$ | 2012 | 24.62 |
| $K^+$ | 661.30 | 0.39 |
| $Ca^{2+}$ | 340.89 | 2.62 |
| Tot-Fe | <0.50 | — |
| $Zn^{2+}$ | <0.005 | — |
| $Sr^{2+}$ | <0.050 | — |

$Li^+$ adsorption behavior was analyzed in terms of (1) flow rate and (2) nanofiber membrane thickness. During lithium recovery, FLUX and TMP were measured. $t_{ex}$ (exhaustion time) at which $V_{ex}$ (total permeate or volume treated) was measured was set to be an adsorption saturation point (Cp/Cf=0.95). For metal and pH analysis, permeate samples (each 20 ml) were periodically collected.

For elemental analysis, a powder sample or a pre-filtered (0.2 mm Nylon membrane) liquid sample (10 mL aliquot) was treated by digesting with 5 mL of 60% $HNO_3$ in MARS-5 microwave oven (CEM, USA). The pre-treated sample was again filtered, diluted with deionized water in a 100 mL polypropylene mass flask, and analyzed using ICP-MS. The remainder of the collected sample was subjected to pH analysis using a pH probe (Schott instruments pH probe (Z451 SI Analytics GmBH, Germany) in Orion 4 star pH meter (Thermo Electron Corporation, USA).

Analysis for $Li^+$ Adsorption Behavior According to Flow Rate Change

Figure 34:
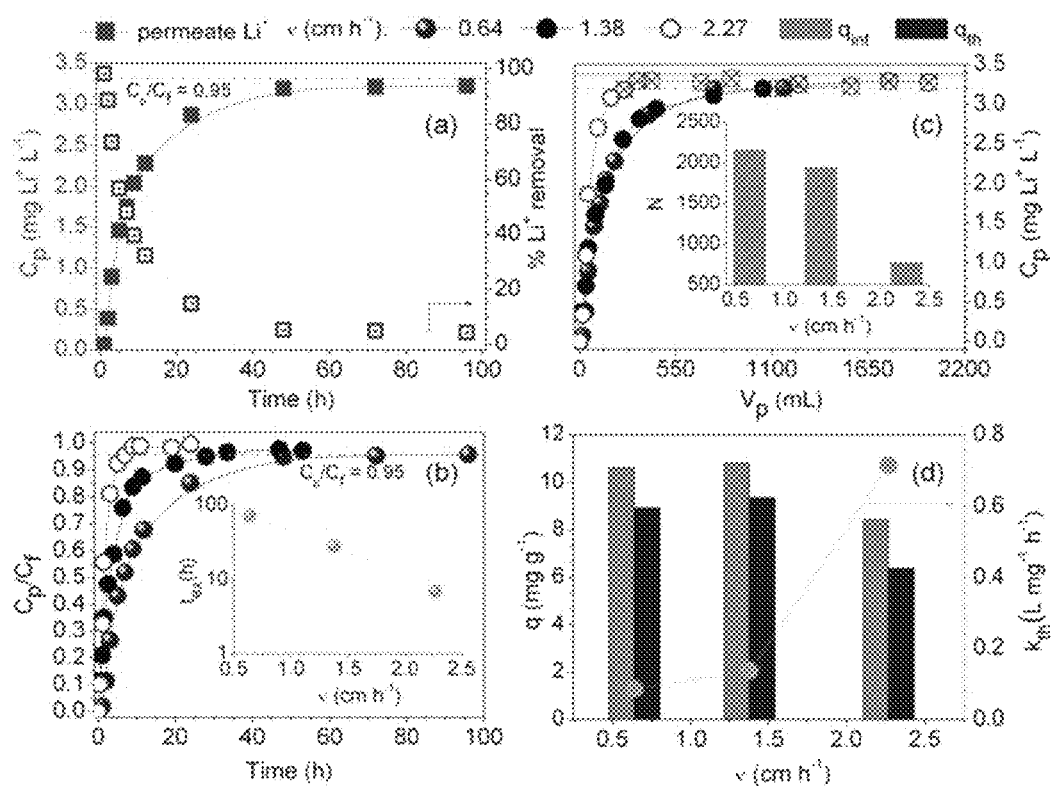
FIG. 34 shows breakthrough adsorption experiment results of the HMO/PSf composite nanofiber membrane at various v (different superficial velocities) using seawater: (a) breakthrough curve of the HMO/PSf (composite nanofiber membrane Li$^+$ permeate concentration vs. time, and % Li$^+$ removal profile vs. time); (b) breakthrough curve of the HMO/PSf composite nanofiber membrane ($C_p/C_f$ vs. time) (inset: t$_{ex}$ (exhaustion time) vs. v); (c) breakthrough curve the HMO/PSf composite nanofiber membrane in terms of V$_p$ (permeate volume) (inset: N vs. v, V$_{ex}$=total V$_p$ at 95% composite nanofiber membrane saturation $C_p/C_f$=0.95); (d) relationship between Thomas model coefficient and q$_{int}$.

FIG. 34 shows breakthrough curves of $Li^+$ adsorption behaviors of composite nanofiber membranes according to change in flow rate in terms of superficial velocity (v=F/A=0.6-2.3 cm $h^{-1}$). FIG. 34a is a breakthrough curve obtained on the HMO/PSf composite nanofiber membrane through which influent seawater has passed at 25° C. The lithium ion concentration of the permeate (permeate concentration, $C_p$) increased with time and finally reached an adsorption saturation point ($C_p/C_f$=0.95) ($C_p$=lithium ion concentration of permeate, $C_f$=lithium ion concentration of influent).

The lithium ion recovery behavior of the composite nanofiber membrane was analyzed using the following Equation 12.

$$N = \frac{V_{ex}}{V_m} \quad (12)$$

wherein $V_m$ is a volume of the composite nanofiber membrane, N is an equivalent number, and $V_{ex}$ is a total volume of the permeate treated.

For the analysis of breakthrough kinetics, the Thomas model was used according to the following Equation 3:

$$\frac{C_p}{C_f} = \frac{1}{1 + \exp\left(k_{th} \times q_{th} \times \frac{m}{F} - k_{th} \times t\right)} \quad (13)$$

wherein, $q_{th}$ is a derived adsorption capacity, $k_{th}$ is a Thomas rate constant, and F is a flow rate FIG. 34b is a breakthrough curve showing the lithium ion recovery behavior of the HMO/PSf(MO/PSf) composite nanofiber membrane. At v=F/A=0.6-2.3 cm $h^{-1}$, TMP was measured to be 2.57-2.61 kPa, without exceeding 0.027 bar. It took 72, 28 and 7 hrs to reach the adsorption saturation point ($C_p/C_f$=0.95) at v=0.64, 1.38, and 2.27 cm $h^{-1}$, respectively.

Figure 35:
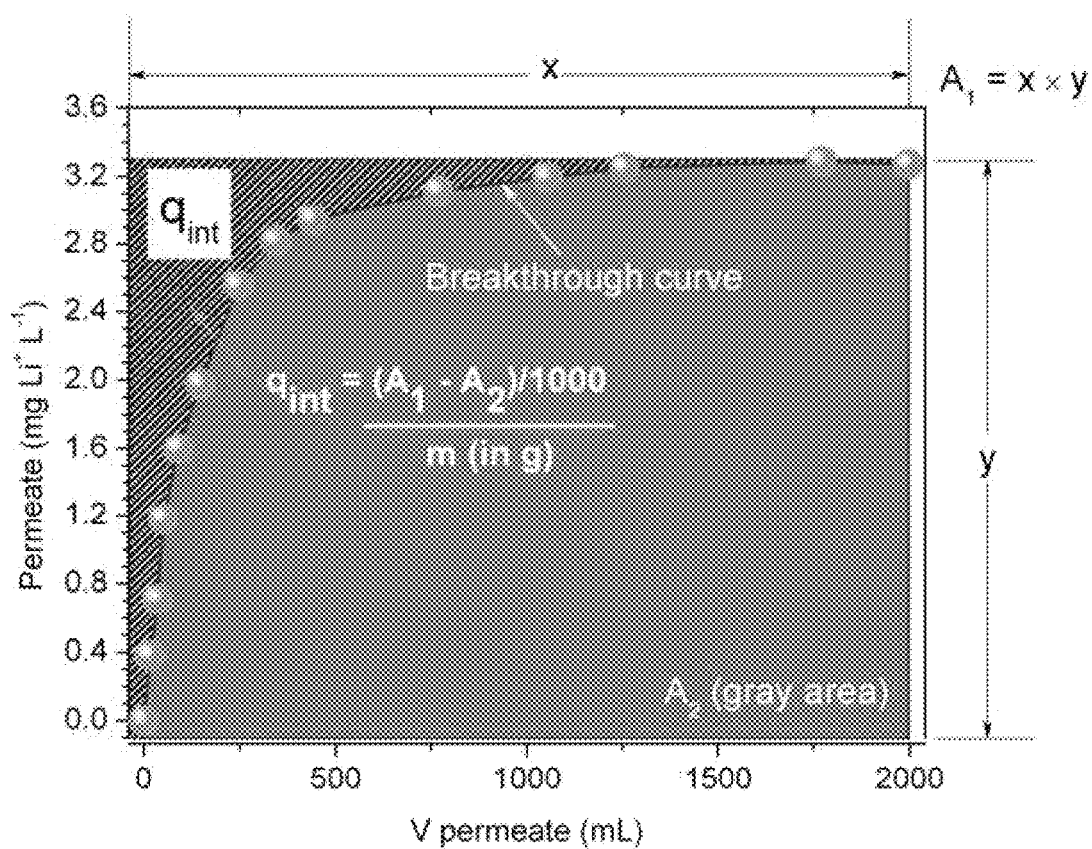
FIG. 35 is a graph illustrating the calculation of an adsorption capacity (q$_{int}$) using an integration method.

FIG. 34c is a graph showing the relationship between $V_p$ (permeate volume measured at time t) and v. As can be seen in FIG. 34c, the total $V_p$ ($V_{ex}$: total volume treated) decreased when v was maximal (see Table 13). In the insert of FIG. 34c, N (see Equation 12) is plotted against v. At v=2.27 cm $h^{-1}$, N was sharply decreased to 775. From FIGS. 34b and 34c, $q_{th}$ and $q_{int}$ (adsorption capacity, see FIG. 35) were derived, as shown in FIG. 34d and Table 13. Similar profiles were drawn for $q_{th}$ and $q_{int}$, showing that the lithium ion adsorption capacity decreased with an increase in flow rate.

TABLE 13

Summary of Thomas model coefficients for the effect of flow rate on continuous filtration experiment (Single layer, thickness ~195 μm; flow rate F: 18 mL to 40 mL h-).

| v (cm $h^{-1}$) | $V_{ex}$ ($cm^3$) | $t_{ex}$ (h) | $t_{adv}$ (min) | N | $q_{int}$ (mg $g^{-1}$) | $q_{th}$ (mg $g^{-1}$) | $k_{th}$ (L $mg^{-1}$ $h^{-1}$) | $r^2$ |
|---|---|---|---|---|---|---|---|---|
| 0.64 | 1167 | 72 | 1.25 | 2161 | 10.62 | 8.92 | 0.086 | 0.94 |
| 1.38 | 1053 | 28 | 0.58 | 1950 | 10.80 | 9.36 | 0.137 | 0.95 |
| 2.27 | 256 | 7 | 0.35 | 775 | 8.43 | 6.37 | 0.714 | 0.97 |

In terms of contact period, the interstitial velocity was estimated to be $v_{int}=v/\epsilon$ ($\epsilon=0.71$ for single layer, see Table 11). During a continuous operation, the advective transport of lithium ions was calculated in terms of contact time $t_{adv}=z/v_{int}$ (z is a thickness of the nanofiber membrane). At a highest value of v, $t_{adv}=0.35$ min, indicating that the contact time is too short at v=2.27 cm h$^{-1}$ for the lithium ions of seawater to reach the HMO (MO) surface of the HMO/PSf composite nanofiber membrane.

Of the tested v values, the most suitable flow rates were measured to be v=0.64 and 1.38 cm h$^{-1}$, which guarantees a period of time for which seawater is in sufficient contact with the composite nanofiber membrane when passing through the membrane. In addition, it is unfavorable to lengthen the operation period for recovering lithium ions in the same amount. Hence, of the two flow rates, v=1.38 cm h$^{-1}$ may be more suitable. Only in order to increase the flow rate (e.g., v=2.27 cm h$^{-1}$), a suitable contact time can be retained by increasing the thickness of the nanofiber membrane.

Figure 36:
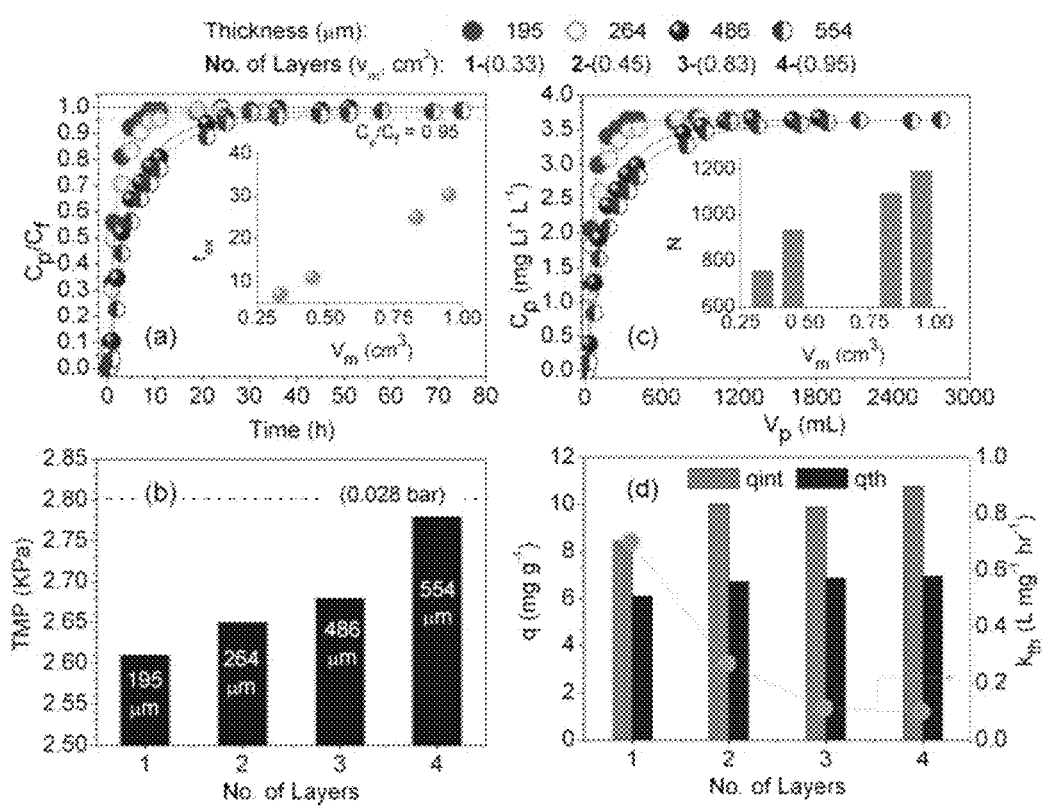
FIG. 36 shows breakthrough adsorption experiment results of the HMO/PSf composite nanofiber membrane at various V$_m$ (different membrane volumes) using seawater: (a) breakthrough curve of the HMO/PSf composite nanofiber membrane (inset: t$_{ex}$ vs. V$_m$); (b) relationship between composite nanofiber membrane thickness (z) and TMP; (c) breakthrough curve of the HMO/PSf composite nanofiber membrane in terms of V$_p$ (permeate volume) (inset: N vs. V$_m$, V$_{ex}$=total V$_p$ at 95% composite nanofiber membrane saturation $C_p/C_f$=0.95); (d) relationship between Thomas model coefficient and q$_{int}$.

Analysis for Li$^+$ Adsorption Behavior of HMO/PSf Composite Nanofiber Membrane According to Thickness Change FIG. 36 shows breakthrough curves of Li$^+$ adsorption behaviors of the HMO/PSf composite nanofiber membrane according to change in membrane thickness (z). As shown in FIG. 36a, it took a longer time to reach the adsorption saturation point ($C_p/C_f=0.95$) with an increase in membrane thickness (z) or membrane volume ($V_m$) ($t_{ex}=7$ h at z=195 mm, $t_{ex}=30.3$ at z=554 mm). TMP increased with thickness, but did not exceed 0.028 bar in any case (see FIG. 36b). In addition, $V_{ex}$=total $V_p$ (total volume treated) and N (equivalent number) significantly increased as the membrane thickness increased (see FIG. 36b, Table 14).

TABLE 14

Summary of Thomas model coefficients for the effect of membrane thickness or volume on continuous filtration experiment (flow rate F: 38 mL ± 0.9 h$^{-1}$; v = 2.27 cm h$^{-1}$).

| No. of Layers | z (μm) | $V_m$ (cm$^3$) | $V_{ex}$ (cm$^3$) | $t_{ex}$ (h) | $t_{adv}$ (min) | N | $q_{int}$ (mg g$^{-1}$) | $q_{th}$ (mg g$^{-1}$) | $k_{th}$ (L mg$^{-1}$ h$^{-1}$) | r$^2$ |
|---|---|---|---|---|---|---|---|---|---|---|
| 1 | 195 | 0.33 | 255 | 7 | 0.35 | 775 | 8.43 | 6.11 | 0.702 | 0.97 |
| 2 | 264 | 0.45 | 424 | 11 | 0.45 | 936 | 10.03 | 6.72 | 0.269 | 0.95 |
| 3 | 486 | 0.83 | 916 | 25 | 0.70 | 1099 | 9.88 | 6.88 | 0.113 | 0.93 |
| 4 | 554 | 0.95 | 1137 | 30 | 0.72 | 1195 | 10.76 | 6.95 | 0.099 | 0.94 |

In terms of contact period, the interstitial velocity was estimated to be $v_{int}=v/\epsilon$ ($\epsilon=0.71$ for single layer, see Table 11). $t_{adv}$ was increased from 0.35 min to 0.72 min as the composite nanofiber membrane increased in thickness. Also, q was found to significantly increase with an increase in contact period.

The breakthrough experiment revealed that the contact period is an important parameter into which account must be taken. Since the HMO/PSf composite nanofiber membrane is used in a flowthrough membrane system, the contact period can be controlled by adjusting the flow rate or membrane thickness. The breakthrough condition under which a maximum adsorption capacity of HMO can be obtained within a short period of time is the most suitable for lithium ion recovery (e.g., high q value and high $k_{th}$ value).

As demonstrated by the breakthrough experiment, the double-layer composite nanofiber membrane was superior in q and $k_{th}$ values to the other membranes. The following experiments were carried out with the double-layer composite nanofiber membrane.

Recyclability of HMO/PSf Composite Nanofiber Membrane

Using the recovery apparatus of FIG. 1, the HMO/PSf composite nanofiber membrane for lithium ion recovery from seawater was analyzed for recyclability and long-term performance. The apparatus was operated in an adsorption mode (U) until the composite nanofiber membrane reached an adsorption saturation point of 95% (Cp/Cf=0.95). Then, 80 mL of deionized water was allowed to pass through the membrane filtration cell (10 min, 100 mL hr$^{-1}$) to remove metal ions bound to either the reactor or the membrane. A recovery mode (R) for desorbing lithium ions was conducted with the recycling of 100 mL of 0.5 M HCl at 350 mL hr$^{-1}$. Thereafter, the regenerated HMO/PSf composite nanofiber membrane was deprived of acid remnants by passing deionized water therethrough (15 min at 100 mL hr$^{-1}$) before the next adsorption/desorption cycle.

As a feed, seawater was used for 5 days to analyze the performance of the HMO/PSf composite nanofiber membrane. This experiment was performed on the dual-layer membrane. In the experiment, $t_{ex}$ was set to be 12 hrs while the other conditions were the same as described for the dual-layer membrane. The remaining 12 hrs were allocated to membrane washing (10 min), lithium ion desorption with 100 mL of 0.5 M HCl (11 hrs), and preparation for the next adsorption. One adsorption/desorption cycle per day was carried out.

Figure 37:
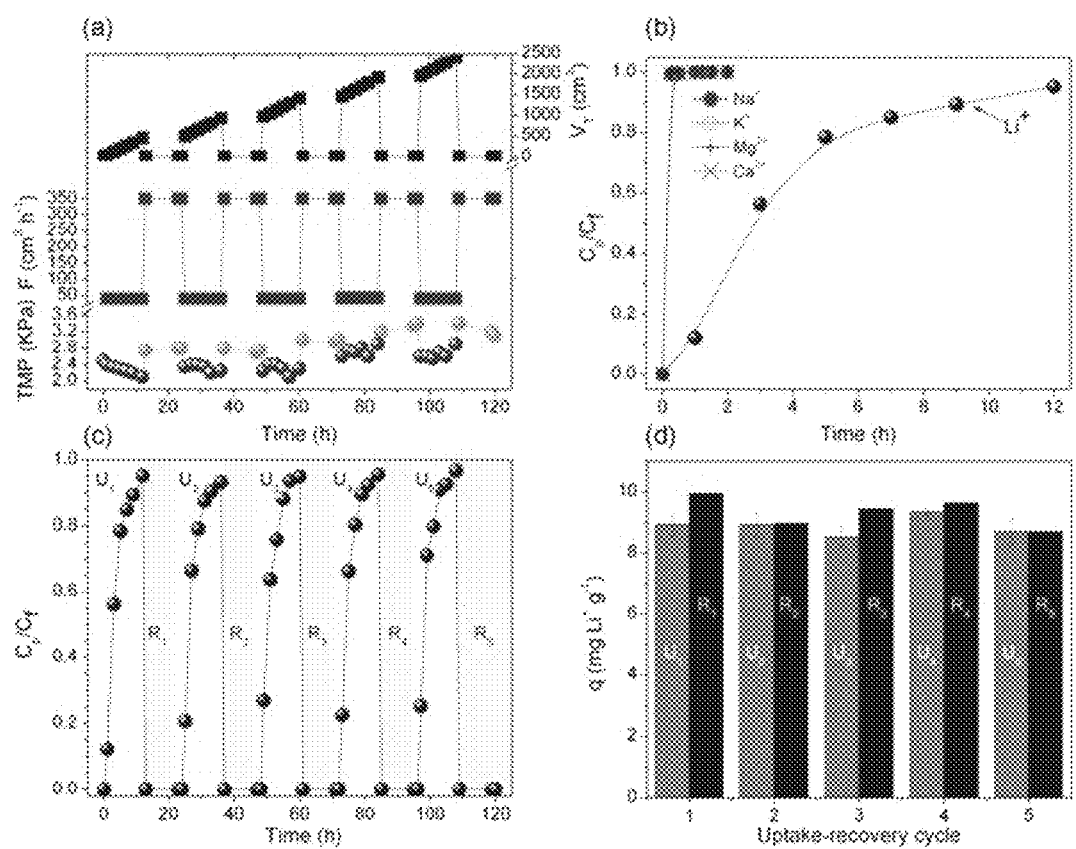
FIG. 37 shows the performance of the HMO/PSf composite nanofiber membrane as analyzed in a dead-end flow through system for lithium ion recovery from seawater: (a) a graph showing relationship between TMP and V$_T$ (Cumulative volume treated) under controlled flow rates (flow rates of feed or acid leaching solution); (b) a breakthrough curve of lithium ions and other major cations (Na$^+$, K$^+$, Mg$^{2+}$, Ca$^{2+}$) of seawater; (c) breatththrough curves in five adsorption/desorption cycles; and (d) adsorption and desorption amounts of lithium ions according to each cycle.

FIG. 37 shows the performance of the HMO/PSf composite nanofiber membrane as analyzed in a dead-end flow through system for lithium ion recovery from seawater. At a constant flow rate, an increase of $V_T$ (cumulative seawater volume treated), and stable TMP were observed, indicating that the HMO/PSf composite nanofiber membrane can be readily operated in the dead-end flow through system (see FIG. 37a). Comparing the breakthrough curve of lithium ions with those of other cations, other cations were observed to reach the adsorption saturation point (Cp/Cf=1) instantaneously, but the adsorption saturation point of lithium ions was remarkably delayed ($C_p/C_f=0.95$ at $t_{ex}=11.8$ h) (FIG. 37b). This result confirmed the selectivity of the HMO/PSf composite nanofiber membrane for lithium ions. As shown in FIG. 37c, the breakthrough curves drawn in five rounds of the adsorption process were almost coincident to one another. Adsorption and desorption amounts of lithium ions are given according to cycle in FIG. 37d and Table 15. On the whole, the amount of lithium eluted in the desorption process was measured to be similar to or greater than the uptake. This was because although the membrane was washed with water after the adsorption process, the lithium contained in the seawater still remaining in the membrane was eluted in the desorption process. The Li uptake in the fifth round of the adsorption process was very slightly decreased compared to that in the first round, demonstrating that the composite nanofiber membrane is chemically very stable.

The minimal decrease in the adsorption performance of the HMO/PSf composite nanofiber membrane, as demonstrated in the regeneration experiment, is indebted to the fact that polysulfone acts as a matrix to alleviate the vulnerability of the HMO powder to acid. Hence, since the HMO powder supported by the polysulfone nanofibers has chemical stability, the HMO/PSf composite nanofiber membrane can retain excellent lithium ion uptake performance even after long-term use.

Furthermore, compared to HMO power, the HMO/PSf composite nanofiber membrane has advantages of being easy to handle, and minimizing HMO loss upon reuse.

TABLE 15

Performance of HMO/PSf membrane in continuous flow-through system

| Cycle no. | Uptake $q_U$ (mg g$^{-1}$) | $q_{th}$ (mg g$^{-1}$) | $k_{th}$ (L mg$^{-1}$ h$^{-1}$) | $r^2$ | Recovery $q_R$ (mg g$^{-1}$) |
|---|---|---|---|---|---|
| 1 | 8.94 ± 0.37 | 9.29 | 0.228 | 0.95 | 9.95 ± 0.46 |
| 2 | 8.93 ± 0.41 | 8.05 | 0.226 | 0.92 | 8.98 ± 0.28 |
| 3 | 8.54 ± 0.30 | 8.44 | 0.203 | 0.94 | 9.45 ± 0.35 |
| 4 | 9.35 ± 0.11 | 8.31 | 0.249 | 0.95 | 9.64 ± 0.40 |
| 5 | 8.71 ± 0.42 | 8.38 | 0.242 | 0.94 | 8.71 ± 0.17 |

Configured to immobilize oxide manganese adsorbent powders on a nanofiber membrane large in surface area per volume, the method of the present invention can prepare a composite nanofiber membrane for lithium adsorption that is easy to handle and which minimizes the performance degradation of the adsorbent powder. In addition, the method may adopt a thermal treatment for enhancing mechanical properties of the composite nanofiber membrane for lithium adsorption.

The composite nanofiber membrane for lithium adsorption in accordance with the present invention exhibits high selectivity for lithium ions and allows for the rapid and easy diffusion of lithium ions through interstitial spaces of the adsorbent. Further, the composite nanofiber membrane according to the present invention has superior lithium adsorption performance, compared to conventional polymer membranes or foams or ceramic membranes immobilized with manganese oxide adsorbents, because it is easier for the adsorbents immobilized on the nanofibers to be in contact with water. Being porous, the composite nanofiber membrane according to the present invention makes it possible to recover lithium by simply being immersed in a solution without additional filtration or energy consumption in a lithium adsorption process.

Particularly, the lithium recovery apparatus using the composite nanofiber membrane for lithium adsorption in accordance with the present invention is able to effectively adsorb lithium ions dissolved in seawater in a selective manner within a short period of time, thus reducing the time taken for the adsorption process. Further, when lithium ions are desorbed from the membrane by acid treatment, a lithium ion desorption process can be swiftly switched to an acid treatment process without translocation of the adsorbent.

In addition to finding applications in selectively adsorbing lithium ions from seawater, the composite nanofiber membrane installed in the recovery apparatus can be used as a pretreatment filter for macroparticles in a seawater desalination plant using a reverse osmosis membrane. Therefore, when applied to seawater desalination, the composite nanofiber membrane for lithium adsorption in accordance with the present invention is economically advantageous because it can remove macroparticles and selectively recover lithium ions.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for preparing a composite nanofiber membrane for lithium adsorption, comprising:
   (a) mixing a lithium-manganese oxide adsorbent powder with a polymeric material in a solvent to give a viscous dope mixture; and
   (b) electrospinning the viscous dope mixture to give a composite nanofiber membrane,
   further comprising treating the composite nanofiber membrane with an acid after the electrospinning of the viscous dope mixture.

2. A method for preparing a composite nanofiber membrane for lithium adsorption, comprising:
   (a) mixing a lithium-manganese oxide adsorbent powder with a polymeric material in a solvent to give a viscous dope mixture; and
   (b) electrospinning the viscous dope mixture to give a composite nanofiber membrane,
   further comprising thermally treating a single sheet or two or more stacked sheets of the composite nanofiber membrane after step (b), wherein the composite nanofiber membrane is controlled in thickness and average pore size by adjusting the number of sheets of the nanofiber membrane to be thermally heated; and
   treating the composite nanofiber membrane with an acid to activate lithium adsorption sites after the thermal treatment step.

3. The method of claim 1, wherein the lithium-manganese oxide adsorbent powder includes at least one selected from the group consisting of $Li_{1.6}Mn_{1.6}O_4$, $L_{1.33}Mn_{1.67}O_4$, $LiMn_2O_4$, and $LiMnO_2$.

4. A method for preparing a composite nanofiber membrane for lithium adsorption, comprising:
   (a) mixing a lithium-manganese oxide adsorbent powder with a polymeric material in a solvent to give a viscous dope mixture; and
   (b) electrospinning the viscous dope mixture to give a composite nanofiber membrane
   wherein the lithium-manganese oxide adsorbent powder is acid-treated lithium-manganese oxide adsorbent powder.

5. The method of claim 4, wherein the acid-treated lithium-manganese oxide adsorbent powder includes at least one selected from the group consisting of $H_{1.6}Mn_{1.6}O_4$, $H_{1.33}Mn_{1.67}O_4$, $HMnO_2$, and $HMn_2O_4$.

6. The method of claim 1, wherein the polymeric material is selected from the group consisting of polysulfone, polyethersulfone, polyacrylonitrile, polyvinylidene fluoride, cellulose acetate, polyvinyl chloride, and a combination thereof.

* * * * *